US011250250B2

United States Patent
Zhang et al.

(10) Patent No.: US 11,250,250 B2
(45) Date of Patent: Feb. 15, 2022

(54) PEDESTRIAN RETRIEVAL METHOD AND APPARATUS

(71) Applicant: Huawei Technologies Co., Ltd., Shenzhen (CN)

(72) Inventors: Wei Zhang, Shenzhen (CN); Maolin Chen, Beijing (CN); Bo Bai, Beijing (CN); Xianbo Mou, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 136 days.

(21) Appl. No.: 16/576,158

(22) Filed: Sep. 19, 2019

(65) Prior Publication Data
US 2020/0012849 A1 Jan. 9, 2020

Related U.S. Application Data

(63) Continuation of application No. PCT/CN2018/078022, filed on Mar. 5, 2018.

(30) Foreign Application Priority Data

Mar. 20, 2017 (CN) .......................... 201710166417.9

(51) Int. Cl.
*G06K 9/00* (2006.01)
*G06T 7/73* (2017.01)
(Continued)

(52) U.S. Cl.
CPC ....... *G06K 9/00369* (2013.01); *G06F 16/152* (2019.01); *G06F 16/9014* (2019.01);
(Continued)

(58) Field of Classification Search
CPC .......... G06K 9/00369; G06K 9/00677; G06K 9/00744; G06K 9/00778; G06K 9/468; G06T 7/73; G06F 16/9014; G06F 16/152
(Continued)

(56) References Cited

U.S. PATENT DOCUMENTS

2007/0206834 A1* 9/2007 Shinkai .................. H04N 7/181
382/103
2012/0057761 A1 3/2012 Li et al.
(Continued)

FOREIGN PATENT DOCUMENTS

CN 101859320 A 10/2010
CN 103207898 A 7/2013
(Continued)

OTHER PUBLICATIONS

Machine Translation and Abstract of Chinese Publication No. CN103207898, Jul. 17, 2013, 13 pages.
(Continued)

*Primary Examiner* — Ayodeji O Ayotunde
(74) *Attorney, Agent, or Firm* — Conley Rose, P.C.

(57) ABSTRACT

A pedestrian retrieval method and apparatus that belong to the video surveillance field include extracting first feature data, second feature data, and third feature data of a target pedestrian image, where the target pedestrian image is an image of a to-be-retrieved pedestrian, and the first feature data, the second feature data, and the third feature data respectively include a plurality of pieces of body multidimensional feature data, a plurality of pieces of upper-body multidimensional feature data, and a plurality of pieces of lower-body multidimensional feature data of the target pedestrian image, screening stored multidimensional feature data based on the first feature data, the second feature data, and the third feature data to obtain a target feature data set, and outputting a pedestrian retrieval result using the target feature data set.

18 Claims, 7 Drawing Sheets

(51) Int. Cl.
  *G06F 16/901* (2019.01)
  *G06F 16/14* (2019.01)
(52) U.S. Cl.
  CPC ..... *G06K 9/00677* (2013.01); *G06K 9/00744* (2013.01); *G06K 9/00778* (2013.01); *G06T 7/73* (2017.01)
(58) Field of Classification Search
  USPC .......................................................... 382/103
  See application file for complete search history.

(56) References Cited

U.S. PATENT DOCUMENTS

| | | | | |
|---|---|---|---|---|
| 2014/0168431 | A1* | 6/2014 | Goto | G06K 9/00342 348/143 |
| 2015/0117773 | A1* | 4/2015 | Kamiya | G06K 9/4652 382/165 |
| 2017/0109852 | A1* | 4/2017 | Ito | G06F 21/32 |
| 2018/0349735 | A1 | 12/2018 | Lin et al. | |

FOREIGN PATENT DOCUMENTS

| | | |
|---|---|---|
| CN | 104199827 A | 12/2014 |
| CN | 104364821 A | 2/2015 |
| CN | 104376334 A | 2/2015 |
| CN | 104484425 A | 4/2015 |
| CN | 105095435 A | 11/2015 |
| CN | 105630906 A | 6/2016 |
| CN | 105808709 A | 7/2016 |
| CN | 103336801 B | 8/2016 |
| KR | 20140077409 A | 6/2014 |

OTHER PUBLICATIONS

Machine Translation and Abstract of Chinese Publication No. CN105630906, Jun. 1, 2016, 21 pages.
Machine Translation and Abstract of Chinese Publication No. CN105808709, Jul. 27, 2016, 14 pages.
Machine Translation and Abstract of Korean Publication No. KR20140077409, Jun. 24, 2014, 23 pages.
Lv, Y., "Asymmetric Hashing for Large Scale Image Retrieval," South China University of Technology, 2015, 1 page.
Foreign Communication From A Counterpart Application, Chinese Application No. 201710166417.9, Chinese Office Action dated Jan. 14, 2020, 11 pages.
Machine Translation and Abstract of Chinese Publication No. CN101859320, Oct. 13, 2010, 12 pages.
Machine Translation and Abstract of Chinese Publication No. CN103336801, Aug. 10, 2016, 17 pages.
Machine Translation and Abstract of Chinese Publication No. CN104199827, Dec. 10, 2014, 18 pages.
Machine Translation and Abstract of Chinese Publication No. CN104376334, Feb. 25, 2015, 10 pages.
Machine Translation and Abstract of Chinese Publication No. CN104484425, Apr. 1, 2015, 10 pages.
Foreign Communication From A Counterpart Application, PCT Application No. PCT/CN2018/078022, English Translation of International Search Report dated Jun. 5, 2018, 2 pages.
Foreign Communication From A Counterpart Application, PCT Application No. PCT/CN2018/078022, English Translation of Written Opinion dated Jun. 5, 2018, 3 pages.
Pala, F., et al., "Multimodal Person Reidentification Using RGB-D Cameras" XP011604993, Apr. 1, 2016, pp. 788-799.
Liu, K., et al., "Anchor-supported multi-modality hashing embedding for person re-identification," XP032543669, Nov. 17, 2013, 6 pages.
Martinel, N., et al., "Learning Pairwise Feature Dissimilarities for Person Re-Identification," XP032580797, Oct. 29, 2013, 6 pages.
Satta, R., "Appearance Descriptors for Person Re-identification: a Comprehensive Review," XP55202172, Jul. 22, 2013, 18 pages.
Foreign Communication From A Counterpart Application, European Application No. 18771586.7, Extended European Search Report dated Feb. 20, 2020, 9 pages.

\* cited by examiner

CONT.
FROM
FIG. 3A

Extract first feature data, second feature data, and third feature data of a target pedestrian image, where the target pedestrian image is an image of a to-be-retrieved pedestrian, the first feature data includes at least one piece of whole-body multidimensional feature data of the target pedestrian image, the second feature data includes at least one piece of upper-body multidimensional feature data of the target pedestrian image, and the third feature data includes at least one piece of lower-body multidimensional feature data of the target pedestrian image — 306

Determine a locality-sensitive hash value and a binary code that correspond to each of the first feature data, the second feature data, and the third feature data — 307

Screen stored multidimensional feature data based on the locality-sensitive hash value and the binary code that correspond to each of the first feature data, the second feature data, and the third feature data to obtain a target feature data set, where the target feature data set includes multidimensional feature data obtained through screening, of a pedestrian image, that matches each of the first feature data, the second feature data, and the third feature data — 308

Determine a pedestrian retrieval result using the target feature data set — 309

FIG. 3B

PEDESTRIAN RETRIEVAL METHOD AND APPARATUS

CROSS-REFERENCE TO RELATED APPLICATIONS

This application is a continuation of International Patent Application No. PCT/CN2018/078022 filed on Mar. 5, 2018, which claims priority to Chinese Patent Application No. 201710166417.9, filed on Mar. 20, 2017. The disclosures of the aforementioned applications are hereby incorporated by reference in their entireties.

TECHNICAL FIELD

This disclosure relates to the video surveillance field, and in particular, to a pedestrian retrieval method and apparatus.

BACKGROUND

With an increasingly urgent requirement for establishing safe cities, video surveillance products are becoming more intelligent. A surveillance video recorded using a video surveillance product usually includes a large quantity of video frame images, and each video frame image may include a plurality of pedestrian images. A pedestrian image means an image area occupied by a pedestrian in the video frame image. Therefore, after surveillance videos are recorded using video surveillance products, massive amounts of pedestrian images are obtained. When a user needs to search for a target pedestrian image from the massive pedestrian images, the user may search using a pedestrian retrieval method in an intelligent video analysis technology.

After recording a surveillance video, a video surveillance product may store the surveillance video in storage space of the video surveillance product in order to facilitate subsequent pedestrian retrieval, or may store the surveillance video in another device that has a video processing function. For ease of description, an apparatus for performing the pedestrian retrieval method is referred to as a pedestrian retrieval apparatus. In a related technology, the pedestrian retrieval apparatus may perform pedestrian retrieval using a bag-of-words model, which includes extracting a large quantity of multidimensional feature data from a large quantity of pedestrian images, and clustering the extracted multidimensional feature data to divide the multidimensional feature data into a plurality of subspace sets, and obtain a clustering center of each subspace set. During retrieval, the user may enter the target pedestrian image and specified query criteria in the pedestrian retrieval apparatus. Then, the pedestrian retrieval apparatus may extract multidimensional feature data of the entered target pedestrian image, calculate a distance between the multidimensional feature data of the target pedestrian image and each of the clustering centers of the plurality of subspace sets, select, from the plurality of subspace sets, a subspace set with a smallest distance from the multidimensional feature data of the target pedestrian image, and determine a pedestrian retrieval result based on the multidimensional feature data and the specified query criteria included in the selected subspace set. The pedestrian retrieval result may be a pedestrian image of a target pedestrian in a surveillance video, or may be a video frame image, a video clip, or the like that includes a target pedestrian.

In actual application, in searching massive quantities of pedestrian images obtained through photographing in a video surveillance scenario, there may be relatively small similarity between a plurality of pedestrian images of a same pedestrian under the impact of a pedestrian posture, light, or the like. Therefore, multidimensional feature data extracted from the plurality of pedestrian images often does not have a good clustering effect, and consequently, pedestrian retrieval accuracy is relatively low.

SUMMARY

To resolve a problem that pedestrian retrieval accuracy is relatively low, embodiments of the present disclosure provide a pedestrian retrieval method and apparatus. The technical solutions are as follows.

According to a first aspect, a pedestrian retrieval method is provided, and the method includes extracting first feature data, second feature data, and third feature data of a target pedestrian image, where the target pedestrian image is an image of a to-be-retrieved pedestrian, the first feature data includes at least one piece of body multidimensional feature data of the target pedestrian image, the second feature data includes at least one piece of upper-body multidimensional feature data of the target pedestrian image, and the third feature data includes at least one piece of lower-body multidimensional feature data of the target pedestrian image, and screening stored multidimensional feature data based on the first feature data, the second feature data, and the third feature data to obtain a target feature data set, and determining a pedestrian retrieval result using the target feature data set, where the target feature data set includes multidimensional feature data obtained through screening, of a pedestrian image, that matches each of the first feature data, the second feature data, and the third feature data.

When the target pedestrian image is received, body multidimensional feature data, upper-body multidimensional feature data, and lower-body multidimensional feature data of one type of feature of the target pedestrian image may be extracted in order to obtain one piece of whole body multidimensional feature data, including one piece of upper-body multidimensional feature data and one piece of lower-body multidimensional feature data. Certainly, whole body multidimensional feature data, upper-body multidimensional feature data, and lower-body multidimensional feature data of a plurality of types of features of the target pedestrian image may be alternatively extracted in order to obtain first feature data that includes a plurality of pieces of body multidimensional feature data, second feature data that includes a plurality of pieces of upper-body multidimensional feature data, and third feature data that includes a plurality of pieces of lower-body multidimensional feature data. That is, "at least one" may be "one" or may be "a plurality of". The plurality of types of features of the target pedestrian image may include a color feature, a texture feature, a depth feature learned using a depth network, and the like of the target pedestrian image.

In this embodiment of the present disclosure, because the extracted multidimensional feature data includes body multidimensional feature data, upper-body multidimensional feature data, and lower-body multidimensional feature data, a pedestrian retrieval result determined based on the extracted multidimensional feature data can ensure that all of a whole body, an upper body, and a lower body of the image of the to-be-retrieved pedestrian are similar to those of the target pedestrian image, thereby ensuring retrieval accuracy. In addition, the extracted multidimensional feature data may include multidimensional feature data of a plurality of types of features of the target pedestrian image.

Therefore, the determined pedestrian retrieval result may be similar to the plurality of types of features of the target pedestrian image, thereby further improving retrieval accuracy.

Optionally, the screening stored multidimensional feature data based on the first feature data, the second feature data, and the third feature data to obtain a target feature data set includes determining a locality-sensitive hash value corresponding to each of the first feature data, the second feature data, and the third feature data, and screening the stored multidimensional feature data based on the locality-sensitive hash value corresponding to each of the first feature data, the second feature data, and the third feature data to obtain the target feature data set, where a locality-sensitive hash value corresponding to any multidimensional feature data included in the target feature data set is the same as a locality-sensitive hash value corresponding to at least one of the first feature data, the second feature data, and the third feature data.

It should be noted that after the first feature data, the second feature data, and the third feature data are extracted, the stored multidimensional feature data may be screened based on the locality-sensitive hash value corresponding to each of the first feature data, the second feature data, and the third feature data in order to obtain the target feature data set, and determine a pedestrian retrieval result based on the target feature data set. Because the stored multidimensional feature data is screened using a locality-sensitive hash value, multidimensional feature data that does not match the target pedestrian image in the multidimensional feature data is filtered out. In this way, when the target feature data set is obtained, a time of loading feature data can be reduced, and retrieval efficiency is ensured while accuracy is ensured above.

Optionally, screening the stored multidimensional feature data based on the locality-sensitive hash value corresponding to each of the first feature data, the second feature data, and the third feature data to obtain the target feature data set includes determining a binary code corresponding to each of the first feature data, the second feature data, and the third feature data, selecting, from a plurality of entries included in a stored whole-body locality-sensitive hash table, an entry corresponding to a locality-sensitive hash value that is the same as the locality-sensitive hash value corresponding to the first feature data to obtain a first entry, where the plurality of entries included in the whole-body locality-sensitive hash table are in a one-to-one correspondence with a plurality of locality-sensitive hash values, and a plurality of feature data identifiers are stored in each entry, selecting, from a plurality of entries included in a stored upper-body locality-sensitive hash table, an entry corresponding to a locality-sensitive hash value that is the same as the locality-sensitive hash value corresponding to the second feature data to obtain a second entry, where the plurality of entries included in the upper-body locality-sensitive hash table are in a one-to-one correspondence with a plurality of locality-sensitive hash values, and a plurality of feature data identifiers are stored in each entry, selecting, from a plurality of entries included in a stored lower-body locality-sensitive hash table, an entry corresponding to a locality-sensitive hash value that is the same as the locality-sensitive hash value corresponding to the third feature data, to obtain a third entry, where the plurality of entries included in the lower-body locality-sensitive hash table are in a one-to-one correspondence with a plurality of locality-sensitive hash values, and a plurality of feature data identifiers are stored in each entry, determining a plurality of first binary codes from a stored correspondence between a body feature data identifier and a binary code based on a plurality of feature data identifiers stored in the first entry, determining a plurality of second binary codes from a stored correspondence between an upper-body feature data identifier and a binary code based on a plurality of feature data identifiers stored in the second entry, and determining a plurality of third binary codes from a stored correspondence between a lower-body feature data identifier and a binary code based on a plurality of feature data identifiers stored in the third entry, and determining the target feature data set from the stored multidimensional feature data based on the binary code corresponding to each of the first feature data, the second feature data, and the third feature data, the plurality of first binary codes, the plurality of second binary codes, and the plurality of third binary codes.

In this embodiment of the present disclosure, not only a locality-sensitive hash value may be used to screen the stored multidimensional feature data, but also a combination of a locality-sensitive hash value and a binary code may be used to perform two times of screening on the stored multidimensional feature data. More noise data is filtered out through two-layer screening, and therefore, an amount of data that needs to be loaded when the target feature data set is obtained is reduced, and retrieval efficiency is improved.

Optionally, determining the target feature data set from the stored multidimensional feature data based on the binary code corresponding to each of the first feature data, the second feature data, and the third feature data, the plurality of first binary codes, the plurality of second binary codes, and the plurality of third binary codes includes determining a hamming distance between the binary code corresponding to the first feature data and each of the plurality of first binary codes, to obtain a plurality of first hamming distances, and generating a first feature data identifier set, where the first feature data identifier set includes a feature data identifier corresponding to a first binary code that is used to determine a hamming distance that is in the plurality of first hamming distances and that is less than a first threshold, determining a hamming distance between the binary code corresponding to the second feature data and each of the plurality of second binary codes, to obtain a plurality of second hamming distances, and generating a second feature data identifier set, where the second feature data identifier set includes a feature data identifier corresponding to a second binary code that is used to determine a hamming distance that is in the plurality of second hamming distances and that is less than a second threshold, determining a hamming distance between the binary code corresponding to the third feature data and each of the plurality of third binary codes to obtain a plurality of third hamming distances, and generating a third feature data identifier set, where the third feature data identifier set includes a feature data identifier corresponding to a third binary code that is used to determine a hamming distance that is in the plurality of third hamming distances and that is less than a third threshold, reduplicating same feature data identifiers in the first feature data identifier set, the second feature data identifier set, and the third feature data identifier set to obtain a fourth feature data identifier set, where body multidimensional feature data, upper-body multidimensional feature data, and lower-body multidimensional feature data of a same pedestrian image are of a same feature data identifier, and obtaining corresponding body multidimensional feature data, upper-body multidimensional feature data, and lower-body multidimensional feature data from the stored multidimensional feature data based on each feature data identifier in the fourth feature data identifier set, to obtain the target feature data set.

It should be noted that, to screen, again, a plurality of feature data identifiers obtained through screening based on a locality-sensitive hash value, and to filter out feature data identifiers of more noise data, each of binary codes corresponding to the feature data identifiers obtained through screening based on the locality-sensitive hash value may be compared with the binary code corresponding to each of the first feature data, the second feature data, and the third feature data to calculate a hamming distance between the two binary codes. When the hamming distance between the two binary codes is smaller, it may be determined that the two binary codes are more similar.

Optionally, determining a pedestrian retrieval result using the target feature data set includes determining a chi-square distance between the first feature data and whole body multidimensional feature data, a chi-square distance between the second feature data and upper-body multidimensional feature data, and a chi-square distance between the third feature data and lower-body multidimensional feature data, where the whole body multidimensional feature data, the upper-body multidimensional feature data, and the lower-body multidimensional feature data correspond to a same feature data identifier in the target feature data set, to obtain a plurality of whole-body distances, a plurality of upper-body distances, and a plurality of lower-body distances, performing, based on preset weights, a weighting operation on a whole-body distance, an upper-body distance, and a lower-body distance that correspond to a same feature data identifier in the plurality of whole-body distances, the plurality of upper-body distances, and the plurality of lower-body distances, to obtain a weighted distance corresponding to each feature data identifier of the multidimensional feature data included in the target feature data set, selecting, based on a stored correspondence between a pedestrian identifier and a feature data identifier, a feature data identifier of a same pedestrian identifier from the feature data identifiers of the multidimensional feature data included in the target feature data set, to obtain a plurality of groups of feature data identifiers, where each group of feature data identifiers corresponds to a same pedestrian identifier, selecting a minimum weighted distance from weighted distances corresponding to each of the plurality of group of feature data identifiers, to obtain a plurality of minimum weighted distances, and sorting the plurality of minimum weighted distances to obtain a sorting result, and determining the pedestrian retrieval result based on feature data identifiers corresponding to the plurality of minimum weighted distances, and displaying the pedestrian retrieval result based on the sorting result.

After the target feature data set is obtained through screening, the multidimensional feature data that is in the target feature data set and that is of a same feature data identifier may be compared with each of the first feature data, the second feature data, and the third feature data of the target pedestrian image, and a distance between the two is sorted based on a value of the distance to obtain a sorting result. The sorting result is a sorting result of a degree of matching between each of the first feature data, the second feature data, and the third feature data of the target pedestrian image and multidimensional feature data of a matching pedestrian image. Certainly, to give a user more choices, a finally determined pedestrian retrieval result may be displayed based on the sorting result.

Optionally, before screening the stored multidimensional feature data based on the locality-sensitive hash value corresponding to each of the first feature data, the second feature data, and the third feature data to obtain the target feature data set, the method further includes obtaining a pedestrian image in a video frame image included in a surveillance video, to obtain a plurality of pedestrian images, separately extracting fourth feature data, fifth feature data, and sixth feature data of each of the plurality of pedestrian images, where the fourth feature data includes at least one piece of body multidimensional feature data of the pedestrian image, the fifth feature data includes at least one piece of upper-body multidimensional feature data of the pedestrian image, and the sixth feature data includes at least one piece of lower-body multidimensional feature data of the pedestrian image, determining a locality-sensitive hash value and a binary code that correspond to each of the fourth feature data, the fifth feature data, and the sixth feature data, allocating a feature data identifier to multidimensional feature data of each of the plurality of pedestrian images, where body multidimensional feature data, upper-body multidimensional feature data, and lower-body multidimensional feature data of a same pedestrian image are of a same feature data identifier, and creating the whole-body locality-sensitive hash table, the upper-body locality-sensitive hash table, the lower-body locality-sensitive hash table, the correspondence between a body feature data identifier and a binary code, the correspondence between an upper-body feature data identifier and a binary code, and the correspondence between a lower-body feature data identifier and a binary code based on the feature data identifier of the multidimensional feature data of each pedestrian image and the locality-sensitive hash value and the binary code that correspond to each of the fourth feature data, the fifth feature data, and the sixth feature data.

It should be noted that an index needs to be built before retrieval is performed using the target pedestrian image. In this way, only when a retrieval request is received, retrieval can be performed based on the target pedestrian image carried in the retrieval request using the built index. In this embodiment of the present disclosure, a plurality of pieces of multidimensional feature data of a pedestrian image that are extracted when the index is being built is consistent with a type of multidimensional feature data that is of the target pedestrian image and that is extracted during the retrieval. To ensure that the stored multidimensional feature data can be screened in three manners, to be specific, using a locality-sensitive hash value or a binary code or a combination of a locality-sensitive hash value and a binary code during the retrieval, when the index is being built, the whole-body locality-sensitive hash table, the upper-body locality-sensitive hash table, the lower-body locality-sensitive hash table, the correspondence between a body feature data identifier and a binary code, the correspondence between an upper-body feature data identifier and a binary code, and the correspondence between a lower-body feature data identifier and a binary code may be created based on the feature data identifier of the multidimensional feature data of the pedestrian image and the locality-sensitive hash value and the binary code that correspond to each of the multidimensional feature data.

Optionally, creating the whole-body locality-sensitive hash table, the upper-body locality-sensitive hash table, the lower-body locality-sensitive hash table, the correspondence between a body feature data identifier and a binary code, the correspondence between an upper-body feature data identifier and a binary code, and the correspondence between a lower-body feature data identifier and a binary code based on the feature data identifier of the multidimensional feature data of each pedestrian image and the locality-sensitive hash value and the binary code that correspond to each of the fourth feature data, the fifth feature data, and the sixth feature data includes dividing the fourth feature data of the plurality of pedestrian images into a plurality of groups, where each group of fourth feature data corresponds to a same locality-sensitive hash value, storing feature data identifiers of a same group of fourth feature data in a same entry in order to create the whole-body locality-sensitive hash table that includes a plurality of entries, dividing the fifth feature data of the plurality of pedestrian images into a plurality of groups, where each group of fifth feature data corresponds to a same locality-sensitive hash value, storing feature data identifiers of a same group of fifth feature data in a same entry in order to create the upper-body locality-sensitive hash table that includes a plurality of entries, dividing the sixth feature data of the plurality of pedestrian images into a plurality of groups, where each group of sixth feature data corresponds to a same locality-sensitive hash value, and storing feature data identifiers of a same group of sixth feature data in a same entry in order to create the lower-body locality-sensitive hash table that includes a plurality of entries, and correspondingly storing feature data identifiers of the fourth feature data of the plurality of pedestrian images and corresponding binary codes in order to create the correspondence between a body feature data identifier and a binary code, correspondingly storing feature data identifiers of the fifth feature data of the plurality of pedestrian images and corresponding binary codes in order to create the correspondence between an upper-body feature data identifier and a binary code, and correspondingly storing feature data identifiers of the sixth feature data of the plurality of pedestrian images and corresponding binary codes in order to create the correspondence between a lower-body feature data identifier and a binary code.

It should be noted that, when a locality-sensitive hash table is created, each entry corresponds to one locality-sensitive hash value, and a plurality of feature data identifiers are stored in each entry, that is, one locality-sensitive hash value may correspond to a plurality of feature data identifiers. In addition, each piece of multidimensional feature data corresponds to one binary code, that is, a feature data identifier of each piece of multidimensional feature data corresponds to one binary code. Accordingly, a correspondence between a feature data identifier and a binary code is obtained.

According to a second aspect, a pedestrian retrieval apparatus is provided, and the pedestrian retrieval apparatus has a function of implementing the pedestrian retrieval method in the first aspect. The pedestrian retrieval apparatus includes at least one module, and the at least one module is configured to implement the pedestrian retrieval method provided in the first aspect.

According to a third aspect, a pedestrian retrieval apparatus is provided, a structure of the pedestrian retrieval apparatus includes a processor and a memory, and the memory is configured to store a program for supporting the pedestrian retrieval apparatus in performing the pedestrian retrieval method provided in the first aspect, and store data used to implement the pedestrian retrieval method provided in the first aspect. The processor is configured to execute the program stored in the memory. The pedestrian retrieval apparatus may further include a communications bus, where the communications bus is configured to establish a connection between the processor and the memory.

According to a fourth aspect, a computer-readable storage medium is provided. The computer-readable storage medium stores an instruction. When the instruction runs on a computer, the computer performs the pedestrian retrieval method described in the first aspect.

According to a fifth aspect, an embodiment of the present disclosure provides a computer program product including an instruction. When the computer program product runs on a computer, the computer performs the pedestrian retrieval method described in the first aspect.

Technical effects achieved by the second aspect, the third aspect, the fourth aspect, and the fifth aspect are similar to a technical effect achieved by a corresponding technical method according to the first aspect. Details are not described herein again.

The technical solutions provided in the embodiments of the present disclosure have the following beneficial effects. The stored multidimensional feature data is screened based on a plurality of pieces of extracted body multidimensional feature data, upper-body multidimensional feature data, and lower-body multidimensional feature data of the target pedestrian image in order to determine a pedestrian retrieval result. Because the extracted multidimensional feature data includes body multidimensional feature data, upper-body multidimensional feature data, and lower-body multidimensional feature data, the pedestrian retrieval result determined based on the extracted multidimensional feature data can ensure that all of a whole body, an upper body, and a lower body are similar, thereby improving retrieval accuracy.

BRIEF DESCRIPTION OF DRAWINGS

FIG. 3A and FIG. 3B are a flowchart of a pedestrian retrieval method according to an embodiment of the present disclosure;

DETAILED DESCRIPTION

To make the objectives, technical solutions, and advantages of this disclosure clearer, the following further describes the implementations of this disclosure in detail with reference to the accompanying drawings.

Figure 1:
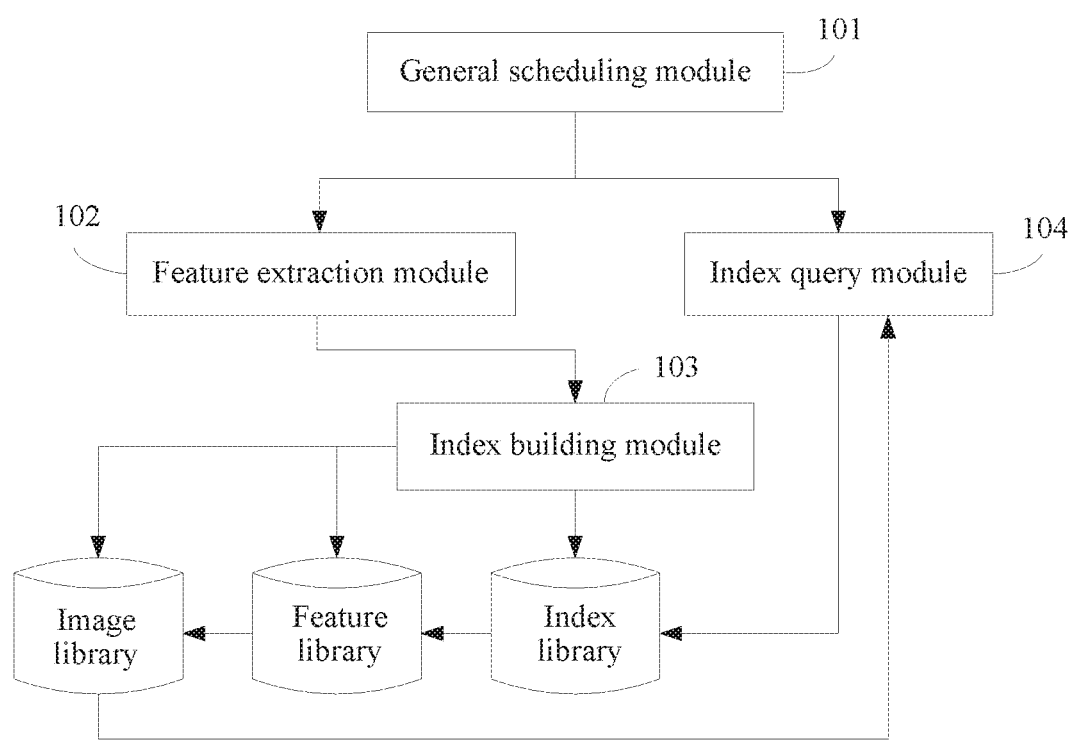
FIG. 1 is a schematic structural diagram of a pedestrian retrieval apparatus according to an embodiment of the present disclosure.

FIG. 1 is a schematic structural diagram of a pedestrian retrieval apparatus according to an embodiment of the present disclosure. As shown in FIG. 1, the pedestrian retrieval apparatus includes a general scheduling module 101, a feature extraction module 102, an index building module 103, and an index query module 104. The modules may be deployed on a same computing node, or may be distributed on different computing nodes. When the modules are distributed on a same computing node, the computing node may further include a video image collection device. When the modules are distributed on different computing nodes, a computing node in which the feature extraction module 102 is located may include a video image collection device, and a computing node in which the general scheduling module 101, the index building module 103, and the index query module 104 are located may not include a video image collection device.

The general scheduling module 101 is configured to deliver an intelligent video analysis task to the feature extraction module 102 and a pedestrian retrieval task to the index query module 104. The feature extraction module 102 may receive a surveillance video collected and sent in real time by a video image collection device, or may receive a surveillance video on a network through a communications interface on a computing node on which the feature extraction module 102 is located. When receiving the intelligent video analysis task delivered by the general scheduling module 101, the feature extraction module 102 may obtain a pedestrian image from the received surveillance video, extract multidimensional feature data of the pedestrian image, and send the pedestrian image and the multidimensional feature data to the index building module 103. The index building module 103 generates an index file, a feature file, and an image file based on the received pedestrian image and multidimensional feature data, and separately stores the index file, the feature file, and the image file in a disk array to form an index library, a feature library, and an image library. Then, when a user triggers, using a client operation interface, a retrieval request that carries a target pedestrian image, the general scheduling module 101 may deliver a pedestrian retrieval task to the index query module 104. When extracting multidimensional feature data of the target pedestrian image, the index query module 104 requests an index file from the index library, and loads the index file to a memory, and obtains an index retrieval result based on the extracted multidimensional feature data of the target pedestrian image using the index file. Then, the index query module 104 obtains a feature data set from the feature library based on the index retrieval result, and obtains a corresponding pedestrian retrieval result from the image library based on the feature data set.

Further, functions of the plurality of modules in the pedestrian retrieval apparatus are described as follows.

The general scheduling module 101 is configured to deliver an intelligent video analysis task and a pedestrian retrieval task.

The feature extraction module 102 is configured to obtain a pedestrian image in a video frame image included in a surveillance video to obtain a plurality of pedestrian images, and separately extract fourth feature data, fifth feature data, and sixth feature data of each of the plurality of pedestrian images, where the fourth feature data includes a plurality of pieces of body multidimensional feature data of the pedestrian image, the fifth feature data includes a plurality of pieces of upper-body multidimensional feature data of the pedestrian image, and the sixth feature data includes a plurality of pieces of lower-body multidimensional feature data of the pedestrian image.

The feature extraction module 102 may obtain a surveillance video using the video image collection device included in the computing node in which the feature extraction module 102 is located, and obtain a large quantity of video frame images included in the surveillance video and pedestrian images in the video frame images. After extracting the fourth feature data, the fifth feature data, and the sixth feature data of the pedestrian image, the feature extraction module 102 may send the obtained video frame images, the pedestrian images, and the extracted multidimensional feature data to the index building module 103.

The index building module 103 is configured to determine a locality-sensitive hash value and a binary code that correspond to each of the fourth feature data, the fifth feature data, and the sixth feature data, allocate a feature data identifier to multidimensional feature data of each of the plurality of pedestrian images, where body multidimensional feature data, upper-body multidimensional feature data, and lower-body multidimensional feature data of a same pedestrian image are of a same feature data identifier, and create, based on a feature data identifier of the multidimensional feature data of each pedestrian image and the locality-sensitive hash value and the binary code that correspond to each of the fourth feature data, the fifth feature data, and the sixth feature data, locality-sensitive hash tables and a correspondence that is between a feature data identifier and a binary code and that corresponds to each of body multidimensional feature data, upper-body multidimensional feature data, and lower-body multidimensional feature data.

After obtaining the locality-sensitive hash tables and the correspondences based on the multidimensional feature data sent by the feature extraction module 102, the index building module 103 generates an index file based on the locality-sensitive hash tables and the correspondences, and stores the index file in a disk array to form an index library. Then, for the received multidimensional feature data, the index building module 103 generates a feature file based on the multidimensional feature data, and stores the feature file in the disk array to form a feature library. In addition, the index building module 103 may further generate an image file based on the video frame images and the pedestrian images that are sent by the feature extraction module 102, and store the image file in the disk array to form an image library.

The index query module 104 is configured to extract first feature data, second feature data, and third feature data of a target pedestrian image, where the target pedestrian image is an image of a to-be-retrieved pedestrian, the first feature data includes a plurality of pieces of body multidimensional feature data of the target pedestrian image, the second feature data includes a plurality of pieces of upper-body multidimensional feature data of the target pedestrian image, and the third feature data includes a plurality of pieces of lower-body multidimensional feature data of the target pedestrian image, determine a locality-sensitive hash value and a binary code that correspond to each of the first feature data, the second feature data, and the third feature data, and screen, based on the locality-sensitive hash value and the binary code that correspond to each of the first feature data, the second feature data, and the third feature data, stored multidimensional feature data to obtain a target feature data set, and determine a pedestrian retrieval result using the target feature data set, where the target feature data set is a set of multidimensional feature data, obtained through screening, of pedestrian images similar to the target pedestrian image.

Figure 2:
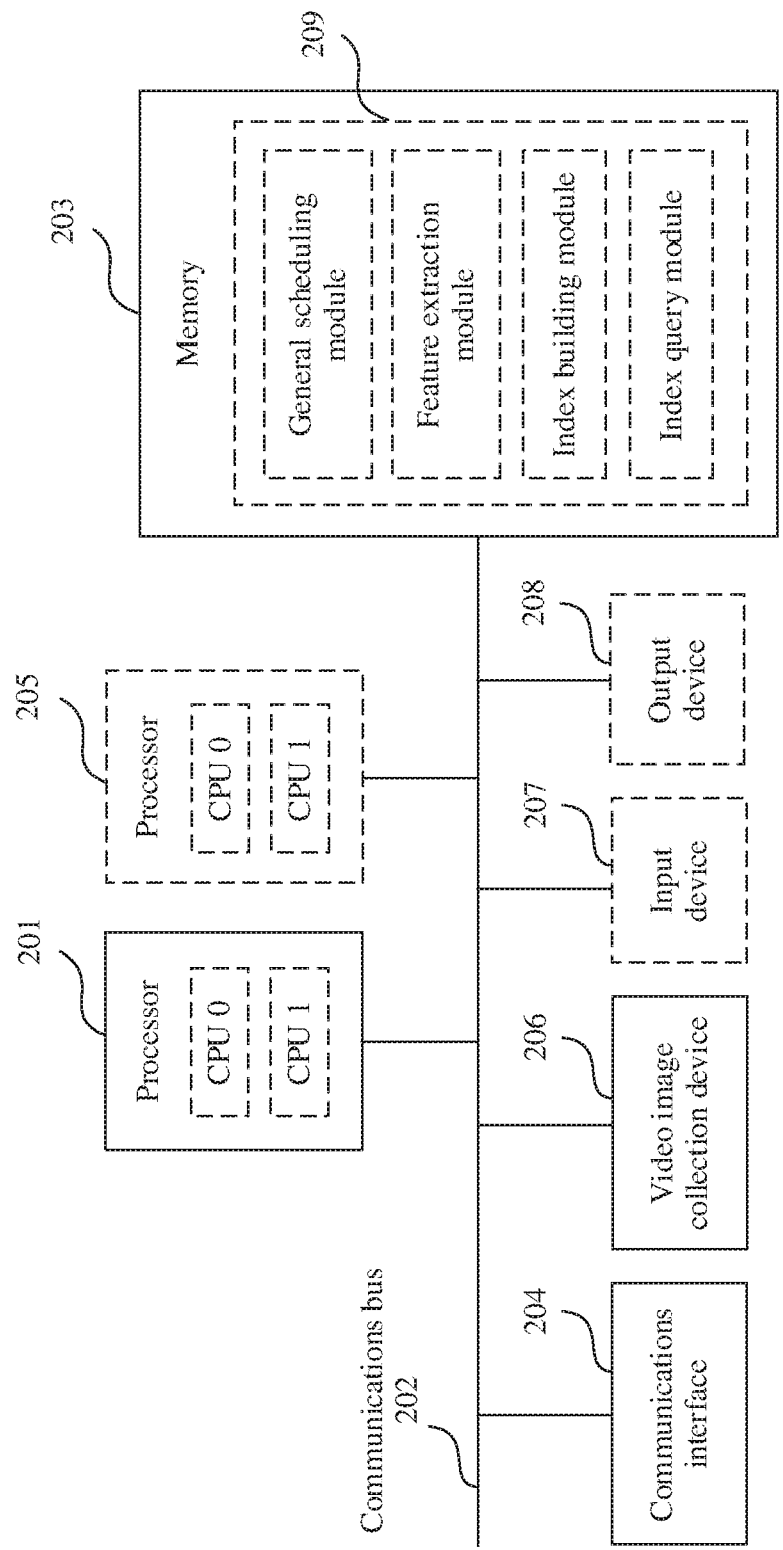
FIG. 2 is a schematic structural diagram of a computing node according to an embodiment of the present disclosure.

FIG. 2 is a schematic structural diagram of a computing node according to an embodiment of the present disclosure. The pedestrian retrieval apparatus in FIG. 1 may be implemented using the computing node shown in FIG. 2, and the computing node may be a terminal or may be a server. Referring to FIG. 2, the computing node includes at least one processor 201, a communications bus 202, a memory 203, and at least one communications interface 204.

The processor 201 may be a general-purpose central processing unit (CPU), a microprocessor, an application-specific integrated circuit (ASIC), or one or more integrated circuits for controlling program execution of the solution in this disclosure.

The communications bus 202 may include a channel used for transmitting information between the foregoing components.

The memory 203 may be, but is not limited to, a read-only memory (ROM), a random access memory (RAM), another type of static storage device that can store static information and instructions, another type of dynamic storage device that can store information and instructions, an electrically erasable programmable ROM (EEPROM), a compact disc (CD) ROM (CD-ROM) or another CD storage, an optical disc storage (including a CD, a laser disc, an optical disc, a digital versatile disc (DVD), a BLU-RAY DISC®, or the like), a magnetic disk storage medium or another magnetic storage device, or any other medium that can be used to carry or store expected program code in an instruction or data structure form and can be accessed by the physical server. The memory 203 may exist independently, may be connected to the processor 201 through the communications bus 202, or may be integrated with the processor 201.

The communications interface 204 is any apparatus such as a transceiver, and configured to communicate with another device or a communications network such as the Ethernet, a radio access network (RAN), or a wireless local area network (WLAN).

In a specific implementation, in an embodiment, the processor 201 may include one or more CPUs, for example, a CPU 0 and a CPU 1 shown in FIG. 2.

In an embodiment, the computing node may include a plurality of processors, such as a processor 201 and a processor 205 shown in FIG. 2. Each of these processors 201 and 205 may be a single-core processor (single-CPU), or may be a multi-core processor (multi-CPU). The processors 201 and 205 herein may be one or more devices, circuits, and/or processing cores configured to process data.

In specific implementation, in an embodiment, the computing node may further include a video image collection device 206, an input device 207, and an output device 208. The video image collection device 206 communicates with the processor 201, and may input a collected surveillance video. For example, the video image collection device 206 may be a digital camera that can convert an analog video signal into a digital signal, or may be an analog camera that directly obtains an analog video signal through photographing. The input device 207 communicates with the processor 201, and may receive input from a user in a plurality of manners. For example, the input device 207 may be a mouse, a keyboard, a touchscreen device, or a sensing device. The output device 208 communicates with the processor 201, and may display information in a plurality of manners. For example, the output device 208 may be a liquid crystal display (LCD), a light emitting diode (LED) display device, a cathode ray tube (CRT) display device, or a projector.

The memory 203 is configured to store program code 209 for executing the solutions of this disclosure, and the processor 201 is configured to execute the program code 209 stored in the memory 203. The program code 209 may include one or more software modules (for example, a general scheduling module, a feature extraction module, an index building module, and an index query module). The pedestrian retrieval apparatus shown in FIG. 1 may determine a pedestrian retrieval result using the processor 201 and one or more software modules in the program code 209 in the memory 203.

It should be noted that the pedestrian retrieval apparatus may also be implemented by a plurality of computing nodes described above, and the general scheduling module 101, the feature extraction module 102, and the index query module 104 of the index building module 103 in the pedestrian retrieval apparatus are separately disposed in different computing nodes. The plurality of computing nodes may communicate with each other using a network.

In this disclosure, when receiving a to-be-retrieved target pedestrian image, the pedestrian retrieval apparatus may screen stored multidimensional feature data based on first feature data, second feature data, and third feature data of the target pedestrian image. The pedestrian retrieval apparatus may screen the stored multidimensional feature data using a locality-sensitive hash value, or may screen the stored multidimensional feature data using a binary code. Certainly, the pedestrian retrieval apparatus may alternatively combine the foregoing two manners, and perform two-layer screening on the stored multidimensional feature data using a locality-sensitive hash value and a binary code. When a locality-sensitive hash value and a binary code are used to screen the stored multidimensional feature data, more noise data is filtered out through two-layer screening, and therefore, an amount of data that needs to be loaded when a target feature data set is obtained is reduced. For the foregoing three different manners of screening the stored multidimensional feature data, a pedestrian retrieval method in this disclosure is further described in the following three embodiments in the embodiments of the present disclosure.

Figure 3A:
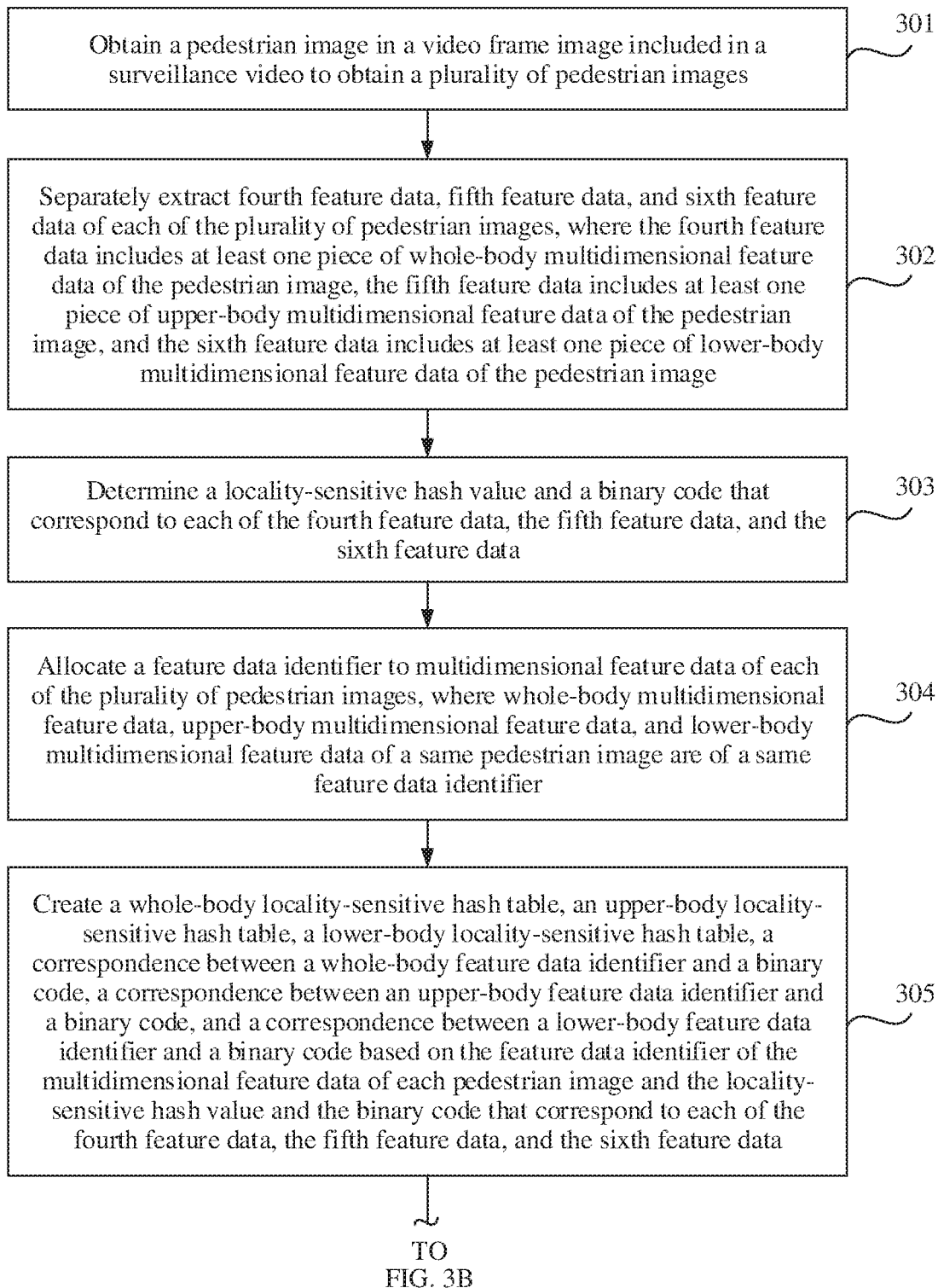

FIG. 3A and FIG. 3B are a flowchart of a pedestrian retrieval method according to an embodiment of the present disclosure. The pedestrian retrieval method is applied to a pedestrian retrieval apparatus. In the method, the pedestrian retrieval apparatus performs two-layer screening on stored multidimensional feature data using a locality-sensitive hash value and a binary code. Referring to FIG. 3A and FIG. 3B, the method includes the following steps.

Step 301. Obtain a pedestrian image in a video frame image included in a surveillance video to obtain a plurality of pedestrian images.

The pedestrian retrieval apparatus may receive a surveillance video collected in real time by a video image collection device, or may obtain a stored surveillance video through network communication. The surveillance video usually includes a large quantity of video frame images, and each video frame image may include a plurality of pedestrian images. After the surveillance video is obtained, the surveillance video is analyzed using a pedestrian detection and tracking technology in order to obtain a plurality of pedestrian images included in each video frame image in the surveillance video. Because a same pedestrian may appear in a plurality of video frame images of the surveillance video, a same pedestrian may correspond to a plurality of pedestrian images.

Step 302. Separately extract fourth feature data, fifth feature data, and sixth feature data of each of the plurality of pedestrian images, where the fourth feature data includes at least one piece of body multidimensional feature data of the pedestrian image, the fifth feature data includes at least one piece of upper-body multidimensional feature data of the pedestrian image, and the sixth feature data includes at least one piece of lower-body multidimensional feature data of the pedestrian image.

After the pedestrian image is obtained, the pedestrian retrieval apparatus may extract feature data of each pedestrian image. When a same pedestrian corresponds to a plurality of pedestrian images, a preset quantity of pedestrian images may be selected from the plurality of pedestrian images corresponding to the pedestrian, to extract feature data.

Usually, when a pedestrian is retrieved, a pedestrian image is likely to be similar to an image of the to-be-retrieved pedestrian only in a whole body, or only in an upper body, or only in a lower body. If a pedestrian retrieval result is determined only depending on whether the two images are similar in a whole body, or the two images are similar in an upper body, or the two images are similar in a lower body, accuracy of the obtained pedestrian retrieval result is relatively low. When all of a whole body, an upper body, and a lower body of the image of the to-be-retrieved pedestrian are similar to a whole body, an upper body and a lower body of the pedestrian image, accuracy of the pedestrian retrieval result obtained accordingly is significantly improved. In addition, the pedestrian image usually includes a plurality of types of features, such as a color feature and a texture feature. During retrieval, the pedestrian retrieval apparatus may filter a pedestrian image using only a single feature. Certainly, because only a single feature is used to filter a pedestrian image, it is likely that an obtained retrieval result is not very accurate because another feature is far from the single feature. Therefore, to avoid the foregoing case, accuracy of a pedestrian retrieval result is further improved, and the pedestrian retrieval apparatus may also filter a pedestrian image using a plurality of types of features.

When a pedestrian image is filtered using a single feature, the pedestrian retrieval apparatus may select any feature from a plurality of types of features included in a plurality of pedestrian images, and extract one piece of body multidimensional feature data, one piece of upper-body multidimensional feature data, and one piece of lower-body multidimensional feature data from each pedestrian image based on the selected feature.

When a pedestrian image is screened using a plurality of types of features, the pedestrian retrieval apparatus may separately extract body multidimensional feature data, upper-body multidimensional feature data, and lower-body multidimensional feature data from a color feature, a texture feature, and the like of each pedestrian image in order to obtain fourth feature data including a plurality of pieces of body multidimensional feature data, fifth feature data including a plurality of pieces of upper-body multidimensional feature data, and sixth feature data including a plurality of pieces of lower-body multidimensional feature data.

When the pedestrian retrieval apparatus extracts body multidimensional feature data, upper-body multidimensional feature data, and lower-body multidimensional feature data from any feature of the pedestrian image, the pedestrian image may be first segmented through component segmentation or a fixed-proportion segmentation technology. Further, the pedestrian retrieval apparatus may divide the pedestrian image into three parts a head, an upper body, and a lower body. Then, multidimensional feature data is uniformly extracted from the three parts, the head, the upper body, and the lower body to obtain body multidimensional feature data. Multidimensional feature data is independently extracted from the upper body part to obtain upper-body multidimensional feature data, and multidimensional feature data is independently extracted from the lower body part to obtain lower-body multidimensional feature data.

It should be noted that, when extracting multidimensional feature data from the pedestrian image, the pedestrian retrieval apparatus may further obtain location information of the pedestrian image in the video frame image and time information of photographing the pedestrian image, and may store the obtained location information and time information as part of the multidimensional feature data. A length of the multidimensional feature data is fixed.

Step 303. Determine a locality-sensitive hash value and a binary code that correspond to each of the fourth feature data, the fifth feature data, and the sixth feature data.

After the fourth feature data, the fifth feature data, and the sixth feature data are extracted, the pedestrian retrieval apparatus may separately calculate, based on a plurality of pieces of multidimensional feature data included in the fourth feature data, the fifth feature data, and the sixth feature data, a locality-sensitive hash value and a binary code that correspond to each piece of multidimensional feature data.

In a possible implementation, any piece of multidimensional feature data x is used as an example, and the pedestrian retrieval apparatus may calculate a locality-sensitive hash value corresponding to multidimensional feature data x according to the following calculation formula (1):

$$h(x) = \sqrt{\frac{2a \cdot x}{w} + 0.5}. \quad (1)$$

In the foregoing formula (1), h(x) is the locality-sensitive hash value corresponding to the multidimensional feature data x, a is a preset vector, an element in the vector a is obtained through random sampling from Gaussian distribution, and a parameter w is a preset positive real number.

Then, the pedestrian retrieval apparatus may calculate a binary code corresponding to the multidimensional feature data x. In a possible implementation, when the multidimensional feature data x is body multidimensional feature data, the pedestrian retrieval apparatus may generate a random vector r that is the same as a dimension of the multidimensional feature data x, and elements in the random vector r are random numbers generated from the Gaussian distribution. When a binary code of the multidimensional feature data x is desired to be of N bits. N random vectors need to be correspondingly generated, and the binary code is obtained through calculation using the following formula (2):

$$h_r(x) = \begin{cases} 1, & \text{if } r^T x \geq 0 \\ 0, & \text{if } r^T x < 0 \end{cases}. \quad (2)$$

When the multidimensional feature data x is upper-body multidimensional feature data or lower-body multidimensional feature data, the pedestrian retrieval apparatus may randomly select one piece of multidimensional feature data r' as a reference point from extracted multidimensional feature data x, then calculate a distance d(x,r') between the multidimensional feature data x and the multidimensional feature data r', and calculate the binary code according to the following formula (3):

$$h_{r'}(x) = \begin{cases} 1, & \text{if } d(x, r') \geq t_{r'} \\ 0, & \text{if } d(x, r') < t_{r'} \end{cases}. \quad (3)$$

In the foregoing formula (2), $h_r(x)$ is a locality-sensitive hash value used when the multidimensional feature data x is the whole-body multidimensional feature data, and $r^T$ is a transposed vector obtained through transposing the random vector r. In the foregoing formula (3), $h_r(x)$ is a locality-sensitive hash value used when the multidimensional feature data x is the upper-body multidimensional feature data or the lower-body multidimensional feature data, the distance $d(x, r')$ may be a distance for measuring a distance between two pieces of multidimensional feature data, such as a chi-square distance or a Euclidean distance, and $t_r$ is a preset threshold.

Step 304. Allocate a feature data identifier to multidimensional feature data of each of the plurality of pedestrian images, where body multidimensional feature data, upper-body multidimensional feature data, and lower-body multidimensional feature data of a same pedestrian image are of a same feature data identifier.

After extracting the fourth feature data, the fifth feature data, and the sixth feature data, the pedestrian retrieval apparatus may store, in a disk array, extracted multidimensional feature data and a pedestrian image corresponding to the multidimensional feature data based on an extraction sequence of extracting the multidimensional feature data of each pedestrian image. For ease of subsequent retrieval, the pedestrian retrieval apparatus can quickly and accurately determine, based on a feature data identifier, that the corresponding multidimensional feature data is body, upper-body, or lower-body multidimensional feature data. The pedestrian retrieval apparatus may extract body multidimensional feature data, upper-body multidimensional feature data, and lower-body multidimensional feature data from each pedestrian image based on a fixed sequence, and a sequence of extracting multidimensional feature data of several types of features from each pedestrian image may also be fixed. In addition, multidimensional feature data of a plurality of pedestrian images corresponding to a same pedestrian image may be stored in a centralized manner. Then, the pedestrian retrieval apparatus may allocate a feature data identifier to the multidimensional feature data of each pedestrian image. In addition, the pedestrian retrieval apparatus may further allocate a pedestrian identifier corresponding to the pedestrian image to the multidimensional feature data of each pedestrian image.

Table 1 is a multidimensional feature data storage sequence shown in this embodiment of the present disclosure. Multidimensional feature data extracted from only one type of feature such as a color feature is used as an example. It is assumed that currently extracted multidimensional feature data comes from four pedestrian images a pedestrian image A, a pedestrian image B, a pedestrian image C, and a pedestrian image D. A sequence of extracting multidimensional feature data from the four pedestrian images is the pedestrian image B, the pedestrian image A, the pedestrian image D, and the pedestrian image C. It is assumed that body multidimensional feature data is first extracted from each pedestrian image, upper-body multidimensional feature data is then extracted, and lower-body multidimensional feature data is finally extracted. The pedestrian image A and the pedestrian image C in the foregoing four pedestrian images belong to a same person, and a storage sequence of the multidimensional feature data extracted from the four pedestrian images is shown in Table 1.

TABLE 1

| Multidimensional feature data storage sequence | | |
|---|---|---|
| Pedestrian identifier 1 | Feature data identifier 1 | Whole-body multidimensional feature data of the pedestrian image B |
| | | Upper-body multidimensional feature data of the pedestrian image B |
| | | Lower-body multidimensional feature data of the pedestrian image B |
| Pedestrian identifier 2 | Feature data identifier 2 | Whole-body multidimensional feature data of the pedestrian image A |
| | | Upper-body multidimensional feature data of the pedestrian image A |
| | | Lower-body multidimensional feature data of the pedestrian image A |
| | Feature data identifier 3 | Whole-body multidimensional feature data of the pedestrian image C |
| | | Upper-body multidimensional feature data of the pedestrian image C |
| | | Lower-body multidimensional feature data of the pedestrian image C |
| Pedestrian identifier 3 | Feature data identifier 4 | Whole-body multidimensional feature data of the pedestrian image D |
| | | Upper-body multidimensional feature data of the pedestrian image D |
| | | Lower-body multidimensional feature data of the pedestrian image D |

The pedestrian retrieval apparatus may store a large amount of extracted multidimensional feature data in a form of a table based on the sequence in Table 1. Certainly, the pedestrian retrieval apparatus may directly store each piece of multidimensional feature data in the disk array based on the foregoing sequence, and store, before each piece of multidimensional feature data, a pedestrian identifier and a feature data identifier that correspond to the multidimensional feature data.

In addition, as shown in Table 1, when a feature data identifier is allocated to each piece of multidimensional feature data, feature data identifiers are sequentially allocated to multidimensional feature data of the pedestrian images based on a storage sequence of the multidimensional feature data of the pedestrian images in the disk array, and the feature data identifier may indicate a location of the multidimensional feature data of each pedestrian image in the disk array.

Step 305. Create a whole body locality-sensitive hash table, an upper-body locality-sensitive hash table, a lower-body locality-sensitive hash table, a correspondence between a body feature data identifier and a binary code, a correspondence between an upper-body feature data identifier and a binary code, and a correspondence between a lower-body feature data identifier and a binary code based on the feature data identifier of the multidimensional feature data of each pedestrian image and the locality-sensitive hash value and the binary code that correspond to each of the fourth feature data, the fifth feature data, and the sixth feature data.

Using step 303 and step 304, after the pedestrian retrieval apparatus determines the locality-sensitive hash value and the binary code that correspond to each of the fourth feature data, the fifth feature data, and the sixth feature data, and the feature data identifier of each pedestrian image, the pedestrian retrieval apparatus may divide the fourth feature data of the plurality of pedestrian images into a plurality of groups based on the locality-sensitive hash value corresponding to the fourth feature data, and store feature data identifiers of a same group of fourth feature data in a same entry in order to create a body locality-sensitive hash table that includes a plurality of entries. Each group of fourth feature data corresponds to a same locality-sensitive hash value. Then, the pedestrian retrieval apparatus may divide the fifth feature data of the plurality of pedestrian images into a plurality of groups, where each group of fifth feature data corresponds to a same locality-sensitive hash value, and store feature data identifiers of a same group of fifth feature data in a same entry in order to create an upper-body locality-sensitive hash table that includes a plurality of entries, and divide the sixth feature data of the plurality of pedestrian images into a plurality of groups, where each group of sixth feature data corresponds to a same locality-sensitive hash value, and store feature data identifiers of a same group of sixth feature data in a same entry in order to create a lower-body locality-sensitive hash table that includes a plurality of entries.

It should be noted that for a different feature, the pedestrian retrieval apparatus may create a whole-body locality-sensitive hash table, an upper-body locality-sensitive hash table, and a lower-body locality-sensitive hash table for the feature. For example, when each of the fourth feature data, the fifth feature data, and the sixth feature data includes two pieces of multidimensional feature data for a color feature and a texture feature, based on the fourth feature data, two locality-sensitive hash tables including a body color feature locality-sensitive hash table and a body texture feature locality-sensitive hash table are created, and similarly, two locality-sensitive hash tables are also separately created based on the fifth feature data and the sixth feature data.

Table 2 is a whole-body locality-sensitive hash table according to this embodiment of the present disclosure. It is assumed that the fourth feature data includes body multidimensional feature data of the color feature and body multidimensional feature data of the texture feature, and the body color feature locality-sensitive hash table created based on the multidimensional feature data of the color feature in the fourth feature data is shown in Table 2. It may be learned from Table 2 that a hash value of body multidimensional feature data of each of three color features whose feature data identifiers are $ID_1$, $ID_4$, and $ID_5$ is $H_1$. Therefore, the feature data identifiers of the three pieces of multidimensional feature data are stored in one entry. In this manner, a plurality of entries may be obtained, and a body locality-sensitive hash table is formed using the plurality of entries.

TABLE 2

Whole-body color feature locality-sensitivity hash table

| Hash value | Feature data identifier |
|---|---|
| $H_1$ | $ID_1$, $ID_4$, and $ID_5$ |
| $H_2$ | $ID_3$ |
| $H_3$ | $ID_2$, $ID_6$, $ID_7$, and $ID_{10}$ |
| $H_4$ | $ID_8$ and $ID_9$ |
| ... | ... |

After the whole-body locality-sensitive hash table, the upper-body locality-sensitive hash table, and the lower-body locality-sensitive hash table are created, the pedestrian retrieval apparatus may correspondingly store feature data identifiers of the fourth feature data of the plurality of pedestrian images and corresponding binary codes in order to create a correspondence between a body feature data identifier and a binary code, correspondingly store feature data identifiers of the fifth feature data of the plurality of pedestrian images and corresponding binary codes in order to create a correspondence between an upper-body feature data identifier and a binary code, and correspondingly store feature data identifiers of the sixth feature data of the plurality of pedestrian images and corresponding binary codes in order to create a correspondence between a lower-body feature data identifier and a binary code.

The fourth feature data is used as an example. When the fourth feature data includes whole-body multidimensional feature data of a plurality of types of features, the pedestrian retrieval apparatus may correspondingly store a feature data identifier of whole-body multidimensional feature data of each type of feature of the plurality of pedestrian images and a corresponding binary code to obtain a correspondence between a whole-body feature data identifier and a binary code of this type of feature. To be specific, it is assumed that the fourth feature data includes the whole-body multidimensional feature data of the color feature and the texture feature, and the pedestrian retrieval apparatus may correspondingly store a feature data identifier of the whole-body multidimensional feature data of the color feature and a corresponding binary code to obtain a correspondence between a whole-body feature data identifier and a binary code of the color feature, and correspondingly store a feature data identifier of the whole-body multidimensional feature data of the texture feature and a corresponding binary code to obtain a correspondence between a whole-body feature data identifier and a binary code of the texture feature.

Using steps 301 to 305, the pedestrian retrieval apparatus extracts a large amount of multidimensional feature data based on the plurality of pedestrian images obtained from the surveillance video, and creates a locality-sensitive hash table and a correspondence between a feature data identifier of multidimensional feature data and a binary code based on the extracted large amount of multidimensional feature data. The pedestrian retrieval apparatus may store the locality-sensitive hash table and the correspondence in an index library in the disk array, store a large amount of multidimensional feature data in a feature library, and store pedestrian images corresponding to the multidimensional feature data in an image library. In this way, the pedestrian retrieval apparatus completes index building. When a retrieval request is received, the pedestrian retrieval apparatus may obtain a pedestrian retrieval result from the feature library and the image library using steps 306 to 308, based on a target pedestrian image carried in the retrieval request, and based on the locality-sensitive hash table and the correspondence that are stored in the index library.

Step 306. Extract first feature data, second feature data, and third feature data of a target pedestrian image, where the target pedestrian image is an image of a to-be-retrieved pedestrian, the first feature data includes at least one piece of whole-body multidimensional feature data of the target pedestrian image, the second feature data includes at least one piece of upper-body multidimensional feature data of the target pedestrian image, and the third feature data includes at least one piece of lower-body multidimensional feature data of the target pedestrian image.

Usually, when a user performs pedestrian retrieval, the image of the to-be-retrieved pedestrian may be input to the pedestrian retrieval apparatus in order to trigger a retrieval request, and the image of the to-be-retrieved pedestrian is the target pedestrian image. When receiving the retrieval request and the target pedestrian image, the pedestrian retrieval apparatus may extract the first feature data, the second feature data, and the third feature data of the target pedestrian image. If in indexes built in steps 301 to 305, each of the fourth feature data, the fifth feature data, and the sixth feature data includes the multidimensional feature data for the color feature and the texture feature, when the target pedestrian image is extracted, the whole-body multidimensional feature data of the color feature and the whole-body multidimensional feature data of the texture feature of the target pedestrian image are extracted to obtain the first feature data, upper-body multidimensional feature data of the color feature and upper-body multidimensional feature data of the texture feature of the target pedestrian image are extracted to obtain the second feature, and lower-body multidimensional feature data of the color feature and lower-body multidimensional feature data of the texture feature of the target pedestrian image are extracted to obtain the third feature data. Certainly, if the fourth feature data, the fifth feature data, and the sixth feature data include multidimensional feature data for one type of feature, when extraction is performed on the target pedestrian image, only whole-body multidimensional feature data, upper-body multidimensional feature data, and lower-body multidimensional feature data for this type of feature are extracted in order to obtain the first feature data, the second feature data, and the third feature data. That is, a type of a feature extracted for the target pedestrian image needs to be the same as a type of a feature extracted when an index is built in steps 301 to 305.

Based on the foregoing description, when multidimensional feature data of a plurality of types of features is extracted from the target pedestrian image, each of the first feature data, the second feature data, and the third feature data includes a plurality of pieces of multidimensional feature data. When multidimensional feature data of one type of feature is extracted from the target pedestrian image, each of the first feature data, the second feature data, and the third feature data includes one piece of multidimensional feature data.

A feature type of the pedestrian image is not limited to a color feature and a texture feature, and may further include a depth feature and the like that are learned using a depth network. In addition, before feature extraction is performed on the target pedestrian image, segmentation also needs to be performed on the target pedestrian image such that the pedestrian retrieval apparatus extracts the first feature data, the second feature data, and the third feature data from the target pedestrian image. For a manner of performing segmentation on the target pedestrian image, refer to the method for performing segmentation on the plurality of pedestrian images in step 302.

It should be further noted that, an extraction sequence of extracting whole-body multidimensional feature data, upper-body multidimensional feature data, and lower-body multidimensional feature data from the target pedestrian image is also fixed, and is the same as the extraction sequence of extracting the whole-body multidimensional feature data, the upper-body multidimensional feature data, and the lower-body multidimensional feature data from each pedestrian image during the foregoing index building. In addition, an extraction sequence of extracting multidimensional feature data of several types of features from the target pedestrian image is also fixed, and the extraction sequence is the same as the extraction sequence of extracting multidimensional feature data of several types of features from each pedestrian image during the foregoing index building.

Step 307. Determine a locality-sensitive hash value and a binary code that correspond to each of the first feature data, the second feature data, and the third feature data.

After the first feature data, the second feature data, and the third feature data of the target pedestrian image are extracted, the pedestrian retrieval apparatus may obtain, through calculation based on the first feature data, a plurality of locality-sensitive hash values corresponding to a plurality of pieces of whole-body multidimensional feature data included in the first feature data, obtain, through calculation based on the second feature data, a plurality of locality-sensitive hash values corresponding to a plurality of pieces of upper-body multidimensional feature data included in the second feature data, and obtain, through calculation based on the third feature data, locality-sensitive hash values corresponding to a plurality of pieces of lower-body multidimensional feature data included in the third feature data. Then, the pedestrian retrieval apparatus may calculate a binary code corresponding to each piece of multidimensional feature data. For a method for calculating, by the pedestrian retrieval apparatus, the corresponding locality-sensitive hash value and binary code based on the multidimensional feature data, refer to the method in step 303. Details are not described again in this embodiment of the present disclosure.

Step 308. Screen stored multidimensional feature data based on the locality-sensitive hash value and the binary code that correspond to each of the first feature data, the second feature data, and the third feature data to obtain a target feature data set, where the target feature data set includes multidimensional feature data obtained through screening, of a pedestrian image, that matches each of the first feature data, the second feature data, and the third feature data.

After determining the locality-sensitive hash value and the binary code that correspond to each of the first feature data, the second feature data, and the third feature data, the pedestrian retrieval apparatus may select, from a plurality of entries included in the stored whole-body locality-sensitive hash table, an entry corresponding to a sensitive hash value that is the same as the locality-sensitive hash value corresponding to the first feature data to obtain a first entry, where the plurality of entries included in the whole-body locality-sensitive hash table are in a one-to-one correspondence with a plurality of locality-sensitive hash values, and a plurality of feature data identifiers are stored in each entry, select, from a plurality of entries included in the stored upper-body locality-sensitive hash table, an entry corresponding to a sensitive hash value that is the same as the locality-sensitive hash value corresponding to the second feature data, to obtain a second entry, where the plurality of entries included in the upper-body locality-sensitive hash table are in a one-to-one correspondence with a plurality of locality-sensitive hash values, and a plurality of feature data identifiers are stored in each entry, select, from a plurality of entries included in the stored lower-body locality-sensitive hash table, an entry corresponding to a sensitive hash value that is the same as the locality-sensitive hash value corresponding to the third feature data, to obtain a third entry, where the plurality of entries included in the lower-body locality-sensitive hash table are in a one-to-one correspondence with a plurality of locality-sensitive hash values, and a plurality of feature data identifiers are stored in each entry, determine a plurality of first binary codes from a stored correspondence between a whole-body feature data identifier and a binary code based on a plurality of feature data identifiers stored in the first entry, determine a plurality of second binary codes from a stored correspondence between an upper-body feature data identifier and a binary code based on a plurality of feature data identifiers stored in the second entry, and determine a plurality of third binary codes from a stored correspondence between a lower-body feature data identifier and a binary code based on a plurality of feature data identifiers stored in the third entry, and determine the target feature data set from the stored multidimensional feature data based on the binary code corresponding to each of the first feature data, the second feature data, and the third feature data, the plurality of first binary codes, the plurality of second binary codes, and the plurality of third binary codes.

For example, it is assumed that the first feature data includes the whole-body multidimensional feature data of the color feature and the whole-body multidimensional feature data of the texture feature, the pedestrian retrieval apparatus may search for, based on a locality-sensitive hash value $H_1$ corresponding to the whole-body multidimensional feature data of the color feature, an entry whose locality-sensitive hash value is $H_1$ from the whole-body color feature locality-sensitive hash table, and then search for, based on a locality-sensitive hash value $H_2$ corresponding to the whole-body multidimensional feature data of the texture feature, an entry whose locality-sensitive hash value is $H_2$ from the whole-body texture feature locality-sensitive hash table. Then, the pedestrian retrieval apparatus obtains all feature data identifiers in the entry corresponding to the locality-sensitive hash value $H_1$ and all feature data identifiers in the entry corresponding to the locality-sensitive hash value $H_2$ to obtain the first entry. For a same pedestrian image, feature data identifiers of all multidimensional feature data of the pedestrian image are the same. Therefore, if all obtained feature data identifiers are mixed, when a corresponding binary code is subsequently determined using the feature data identifier, it cannot be determined whether the feature data identifier is a whole-body feature data identifier of the color feature or the texture feature. To avoid the foregoing problem, the pedestrian retrieval apparatus may separately obtain, based on a preset feature extraction sequence, feature data identifiers corresponding to different features as sub-entries in order to obtain the first entry. Using the foregoing example, a feature data identifier corresponding to the locality-sensitive hash value $H_1$ may be obtained, to obtain a sub-entry 1, and a feature data identifier corresponding to the locality-sensitive hash value $H_2$ is obtained in order to obtain a sub-entry 2. The sub-entry 1 and the sub-entry 2 jointly form the first entry.

Feature data identifiers in an entry corresponding to a locality-sensitive hash value that is the same as the locality-sensitive hash value corresponding to each of the second feature data and the third feature data are obtained in the foregoing manner of obtaining the first entry to obtain the second entry and the third entry.

After the first entry, the second entry, and the third entry are obtained, the pedestrian retrieval apparatus may first obtain, from the stored correspondence between a whole-body feature data identifier and a binary code, the plurality of first binary codes corresponding to the feature data identifiers in the first entry. When the first entry includes a plurality of sub-entries, the pedestrian retrieval apparatus may determine, based on sequence numbers of sub-entries in the first entry, features corresponding to the sub-entries, and obtain binary codes of feature data identifiers of the determined features to obtain the first binary codes. In this case, for subsequently calculating a distance from a binary code of the target pedestrian image, binary codes of different features can be accurately distinguished, and the plurality of first binary codes may be grouped based on a corresponding feature type. Then, the pedestrian retrieval apparatus may separately obtain the plurality of second binary codes and third binary codes based on the feature data identifiers in the second entry and the third entry in the foregoing manner.

After the first binary code, the second binary code, and the third binary code are determined, the pedestrian retrieval apparatus may determine the target feature data set using the following operations. The operations include determining a hamming distance between the binary code corresponding to the first feature data and each of the plurality of first binary codes to obtain a plurality of first hamming distances, selecting a hamming distance less than a first threshold from the plurality of first hamming distances, and generating a first feature data identifier set based on a feature data identifier corresponding to a first binary code of the selected hamming distance, determining a hamming distance between the binary code corresponding to the second feature data and each of the plurality of second binary codes to obtain a plurality of second hamming distances, selecting a hamming distance less than a second threshold from the plurality of second hamming distances, and generating a second feature data identifier set based on a feature data identifier corresponding to a second binary code of the selected hamming distance, determining a hamming distance between the binary code corresponding to the third feature data and each of the plurality of third binary codes, to obtain a plurality of third hamming distances, selecting a hamming distance less than a third threshold from the plurality of third hamming distances, and generating a third feature data identifier set based on a feature data identifier corresponding to a third binary code of the selected hamming distance, reduplicating same feature data identifiers in the first feature data identifier set, the second feature data identifier set, and the third feature data identifier set to obtain a fourth feature data identifier set, where whole-body multidimensional feature data, upper-body multidimensional feature data, and lower-body multidimensional feature data of a same pedestrian image are of a same feature data identifier, and obtaining corresponding whole-body multidimensional feature data, upper-body multidimensional feature data, and lower-body multidimensional feature data from the stored multidimensional feature data based on each feature data identifier in the fourth feature data identifier set to obtain the target feature data set.

The first feature data is used as an example for description. When the first feature data includes the multidimensional feature data of the plurality of types of features, the pedestrian retrieval apparatus may calculate a hamming distance between a binary code corresponding to whole-body multidimensional feature data of each type of feature and a corresponding binary code of the feature in the plurality of first binary codes, to obtain the plurality of first hamming distances. For example, it is assumed that the first feature data includes the whole-body multidimensional feature data of the color feature and the texture feature, and corresponding binary codes are respectively $M_1$ and $M_2$. In the plurality of first binary codes obtained through calculation, a plurality of first binary codes of the color feature are $a_1$, $a_2$, $a_3$, and $a_4$ and a plurality of first binary codes corresponding to the texture feature are $a_5$, $a_6$, and $a_7$. In this case, the pedestrian retrieval apparatus may calculate a hamming distance between $M_1$ and each of $a_1$, $a_2$, $a_3$, and $a_4$, and a hamming distance between $M_2$ and each of $a_5$, $a_6$, and $a_7$ in order to obtain seven first hamming distances.

In addition, feature data identifiers corresponding to all multidimensional feature data of a same pedestrian image are the same, and therefore, same feature data identifiers may exist in the obtained first feature data identifier set, second feature data identifier set, and third feature data identifier set. In addition, when the target feature data set is subsequently determined, different multidimensional feature data of a same pedestrian image can be obtained using only one feature data identifier, the pedestrian retrieval apparatus may reduplicate the same feature data identifiers in the first feature data identifier set, the second feature data identifier set, and the third feature data identifier set to obtain the fourth feature data identifier set.

It should be noted that, because the fourth feature data identifier set is obtained through two times of screening using a locality-sensitive hash value and a binary code, feature data identifiers of a large amount of noise data are filtered out. In this way, when the fourth feature data identifier set is used to obtain the target feature data, the pedestrian retrieval apparatus can reduce a quantity of times of loading multidimensional feature data, thereby improving retrieval efficiency. In addition, because a large amount of stored multidimensional feature data is screened in two different manners, accuracy of the finally determined target feature data set is also ensured.

After the fourth feature data identifier set is obtained, it may be learned from step 304 that the feature data identifiers are allocated based on a sequence in which feature data is stored in the disk array. Therefore, an offset of each piece of feature data in a feature library may be obtained through calculation based on each feature data identifier in the fourth feature data identifier set, namely, a storage location of each piece of feature data in the feature library in order to search to obtain all multidimensional feature data that is of a pedestrian image corresponding to each feature data identifier in the fourth feature data identifier set, and obtain the target feature data set.

It should be noted that when pedestrian retrieval is performed, retrieval focuses of different users are also different. For example, some users expect to screen a whole-body feature more strictly during retrieval, to be specific, the whole-body feature is more similar to a whole-body feature of the target pedestrian feature in a finally obtained pedestrian retrieval result. However, some users may consider that a lower body appearance change is relatively small and a feature difference is small, and therefore, may expect to screen a lower-body feature more strictly to remove more noise data. Therefore, for different retrieval requirements, a value relationship between the first threshold, the second threshold, and the third threshold may be controlled to achieve the foregoing objective. When the first threshold is less than the second threshold and is less than the third threshold, a stricter screening threshold is used for the whole-body feature. In this case, a pedestrian retrieval result that the whole-body feature is more similar to the whole-body feature of the target pedestrian image is obtained. When the second threshold is less than the first threshold and is less than the third threshold, a stricter screening threshold is used for an upper-body feature. In this case, a pedestrian retrieval result that the upper-body feature is more similar to an upper-body feature of the target pedestrian image is obtained. When the third threshold is less than the first threshold and is less than the second threshold, a stricter screening threshold is used for a lower-body feature. In this case, a pedestrian retrieval result that the lower-body feature is more similar to a lower-body feature of the target pedestrian image is obtained.

Optionally, the first feature data, the second feature data, and the third feature data may include the multidimensional feature data of the plurality of types of features. Therefore, first, the pedestrian retrieval apparatus may determine, for multidimensional feature data of a first type of feature in the plurality of types of features to obtain the first entry, the second entry, and the third entry, then determine a first binary code, a second binary code, and a third binary code of this type of feature based on the first entry, the second entry, and the third entry, and determine, based on the determined first binary code, second binary code, and third binary code, to obtain the first feature data identifier set, the second feature data identifier set, and the third feature data identifier set. Second, the pedestrian retrieval apparatus may obtain the three feature data identifier sets in the foregoing manner for a second type of feature in the plurality of types of features. In this way, after the feature data identifier set is determined for the multidimensional feature data of all the features, a same feature data identifier set in all the determined feature data identifier sets is reduplicated to obtain the fourth feature data identifier set, and then all the multidimensional feature data of the corresponding pedestrian image is obtained based on the feature data identifiers in the fourth feature data identifier set to obtain the target feature data set.

For the method for determining the first entry, the second entry, and the third entry, the method for determining the first binary code, the second binary code, and the third binary code, the method for determining the first feature data identifier set, the second feature data identifier set, and the third feature data identifier set, and the method for determining the target feature data set based on the fourth feature data identifier set, refer to the foregoing method in this step. Details are not described again in this embodiment of the present disclosure.

Step 309. Determine a pedestrian retrieval result using the target feature data set.

Using steps 306 to 308, the pedestrian retrieval apparatus may determine to obtain the target feature data set, where multidimensional feature data in the target feature data set is obtained through two-layer screening to be specific, using a locality-sensitive hash value and a binary code. To be specific, the multidimensional feature data in the target feature data set is multidimensional feature data, obtained through screening, of a pedestrian image similar to the target pedestrian image. In this case, the pedestrian retrieval result determined by the pedestrian retrieval apparatus using the target feature data set is a pedestrian retrieval result similar to the target pedestrian image.

Further, an operation of determining, by the pedestrian retrieval apparatus, the pedestrian retrieval result using the target feature data set may be determining a chi-square distance between the first feature data and whole-body multidimensional feature data, a chi-square distance between the second feature data and upper-body multidimensional feature data, and a chi-square distance between the third feature data and lower-body multidimensional feature data, where the whole-body multidimensional feature data, the upper-body multidimensional feature data, and the lower-body multidimensional feature data correspond to a same feature data identifier in the target feature data set to obtain a plurality of whole-body distances, a plurality of upper-body distances, and a plurality of lower-body distances, performing, based on preset weights, a weighting operation on a whole-body distance, an upper-body distance, and a lower-body distance that correspond to a same feature data identifier in the plurality of whole-body distances, the plurality of upper-body distances, and the plurality of lower-body distances, to obtain a weighted distance corresponding to each feature data identifier of the multidimensional feature data included in the target feature data set, selecting, based on a stored correspondence between a pedestrian identifier and a feature data identifier, a feature data identifier of a same pedestrian identifier from the feature data identifiers of the multidimensional feature data included in the target feature data set, to obtain a plurality of groups of feature data identifiers, where each group of feature data identifiers corresponds to a same pedestrian identifier, selecting a minimum weighted distance from weighted distances corresponding to each of the plurality of group of feature data identifiers, to obtain a plurality of minimum weighted distances, and sorting the plurality of minimum weighted distances to obtain a sorting result, and determining the pedestrian retrieval result based on feature data identifiers corresponding to the plurality of minimum weighted distances, and displaying the pedestrian retrieval result based on the sorting result.

The first feature data is used as an example. When the first feature data includes the whole-body multidimensional feature data of the plurality of types of features, the pedestrian retrieval apparatus may calculate a chi-square distance between whole-body multidimensional feature data of each type of feature and whole-body multidimensional feature data of this type of feature corresponding to each feature data identifier in the target feature data set in order to obtain whole-body distances of the plurality of types of features corresponding to each feature data identifier. Then, the pedestrian retrieval apparatus may directly add whole-body distances of a plurality of types of features corresponding to each feature data identifier together, to obtain a plurality of whole-body distances, or may multiply whole-body distances of a plurality of types features corresponding to each feature data identifier by preset feature weights and then add obtained products together, to obtain a plurality of whole-body distances. A sum of feature weights of the plurality of types of features is 1.

For example, it is assumed that the first feature data includes whole-body multidimensional feature data $x_1$ of a color feature and whole-body multidimensional feature data $x_2$ of a texture feature. The target feature data set includes whole-body multidimensional feature data $y_1$ of a color feature whose feature data identifier is $ID_1$ and whole-body multidimensional feature data $w_1$ of a texture feature. The pedestrian retrieval apparatus may calculate a chi-square distance $d_1$ between $x_1$ and $y_1$, and calculate a chi-square distance $d_2$ between $x_2$ and $w_1$. Then, the pedestrian retrieval apparatus may directly add $d_1$ and $d_2$, to obtain a whole-body distance corresponding to the feature data identifier $ID_1$ ($d_1+d_2$). Certainly, if each type of feature has a preset feature weight, for example, a feature weight of the color feature is $p_1$, and a feature weight of the texture feature is $p_2$, an obtained whole-body distance corresponding to the feature data identifier $ID_1$ may be ($p_1d_1+p_2d_2$), where $p_1+p_2=1$.

It should be noted that for a manner of determining a chi-square distance between the second feature data and upper-body multidimensional feature data and a chi-square distance between the third feature data and lower-body multidimensional feature data to obtain a plurality of upper-body distances and a plurality of lower-body distances, where the upper-body multidimensional feature data and the lower-body multidimensional feature data correspond to a same feature data identifier in the target feature data set, refer to the foregoing manner of determining the plurality of whole-body distances.

In addition, after the plurality of whole-body distances, the plurality of upper-body distances, and the plurality of lower-body distances are determined, the pedestrian retrieval apparatus may multiply a whole-body distance corresponding to each feature data identifier by a preset whole-body weight to obtain a whole-body weighted distance, multiply an upper-body distance corresponding to each feature data identifier by a preset upper-body weight to obtain an upper-body weighted distance, multiply a lower-body distance corresponding to each feature data identifier by a preset lower-body weight to obtain a lower-body weighted distance, and then add an obtained whole-body weighted distance, upper-body weighted distance, and lower-body weighted distance of a same feature data identifier, to obtain a weighted distance corresponding to each feature data identifier of the multidimensional feature data included in the target feature data set. A sum of the whole-body weight, the upper-body weight, and the lower-body weight is 1.

A same pedestrian may correspond to a plurality of pedestrian images. Therefore, multidimensional feature data corresponding to several feature data identifiers in the target feature data set is likely to belong to a same pedestrian. In order that finally output pedestrian retrieval results can provide more choices for a user, and to ensure that a pedestrian image of each pedestrian in the output pedestrian retrieval results is most similar to the target pedestrian image in a plurality of pedestrian images of the pedestrian, the pedestrian retrieval apparatus may select, based on the stored correspondence between a pedestrian identifier and a feature data identifier, a feature data identifier of a same pedestrian identifier from the feature data identifiers of the multidimensional feature data included in the target feature data set, to obtain a plurality of groups of feature data identifiers, and then select a minimum weighted distance from a weighted distance corresponding to each of the plurality of groups of feature data identifiers to obtain a plurality of minimum weighted distances. Pedestrian images corresponding to feature data identifiers corresponding to the plurality of minimum weighted distances are pedestrian images that are in a plurality of pedestrian images of each pedestrian and that most match the target pedestrian image. Then, the pedestrian retrieval apparatus may sort the plurality of minimum weighted distances to obtain a sorting result, and sequentially display the pedestrian retrieval results based on the sorting result. Certainly, if there is a relatively large quantity of determined minimum weighted distances, the pedestrian retrieval apparatus may also select, based on the sorting result, feature data identifiers corresponding to the first preset quantity of rankings of minimum weighted distances that are in the sorting result, determine pedestrian retrieval results, and display the pedestrian retrieval results based on a sequence in the sorting result.

It should be noted that the pedestrian retrieval apparatus may obtain, from the image library, the pedestrian images corresponding to the feature data identifiers based on the feature data identifiers corresponding to the plurality of minimum weighted distances. In addition, the pedestrian retrieval apparatus may further determine, from the feature library, all information such as a location and a time at which the pedestrian appears in a surveillance video based on a pedestrian identifier corresponding to the feature data identifiers. Then, the pedestrian retrieval apparatus may display, based on a sorting result, a pedestrian image, location information, and time information that correspond to each pedestrian.

In this embodiment of the present disclosure, the pedestrian retrieval apparatus may extract a plurality of pieces of whole-body multidimensional feature data, upper-body multidimensional feature data, and lower-body multidimensional feature data from a plurality of pedestrian images, and build an index using a locality-sensitive hash value and a binary code. Then, after receiving a retrieval request, the pedestrian retrieval apparatus may screen a large amount of stored multidimensional feature data based on a target pedestrian image using a locality-sensitive hash value and a binary code in order to obtain a target feature data set of pedestrian images similar to the target pedestrian image.

Then, the pedestrian retrieval apparatus may determine a pedestrian retrieval result based on the target feature data set. Because the pedestrian retrieval result is obtained through screening in two manners, to be specific, using a locality-sensitive hash value and a binary code, accuracy of the pedestrian retrieval result is ensured. In addition, because the extracted multidimensional feature data includes whole-body multidimensional feature data, upper-body multidimensional feature data, and lower-body multidimensional feature data, a pedestrian retrieval result determined based on the extracted multidimensional feature data can ensure that all of a whole body, an upper body, and a lower body are similar, to be specific, retrieval accuracy is ensured. In addition, the extracted multidimensional feature data may include multidimensional feature data of different features. Therefore, the determined pedestrian retrieval result may be similar to a plurality of features of the target pedestrian image, thereby further improving retrieval accuracy. Based on the foregoing ensured retrieval accuracy, because the pedestrian retrieval apparatus performs two-layer screening on feature data identifiers of a large amount of multidimensional feature data, feature data identifiers of more noise data are filtered out. Then, when multidimensional feature data and a pedestrian retrieval result are obtained based on feature data identifiers obtained after the filtering, a time of loading data is greatly reduced, and retrieval efficiency is improved.

Figure 4:
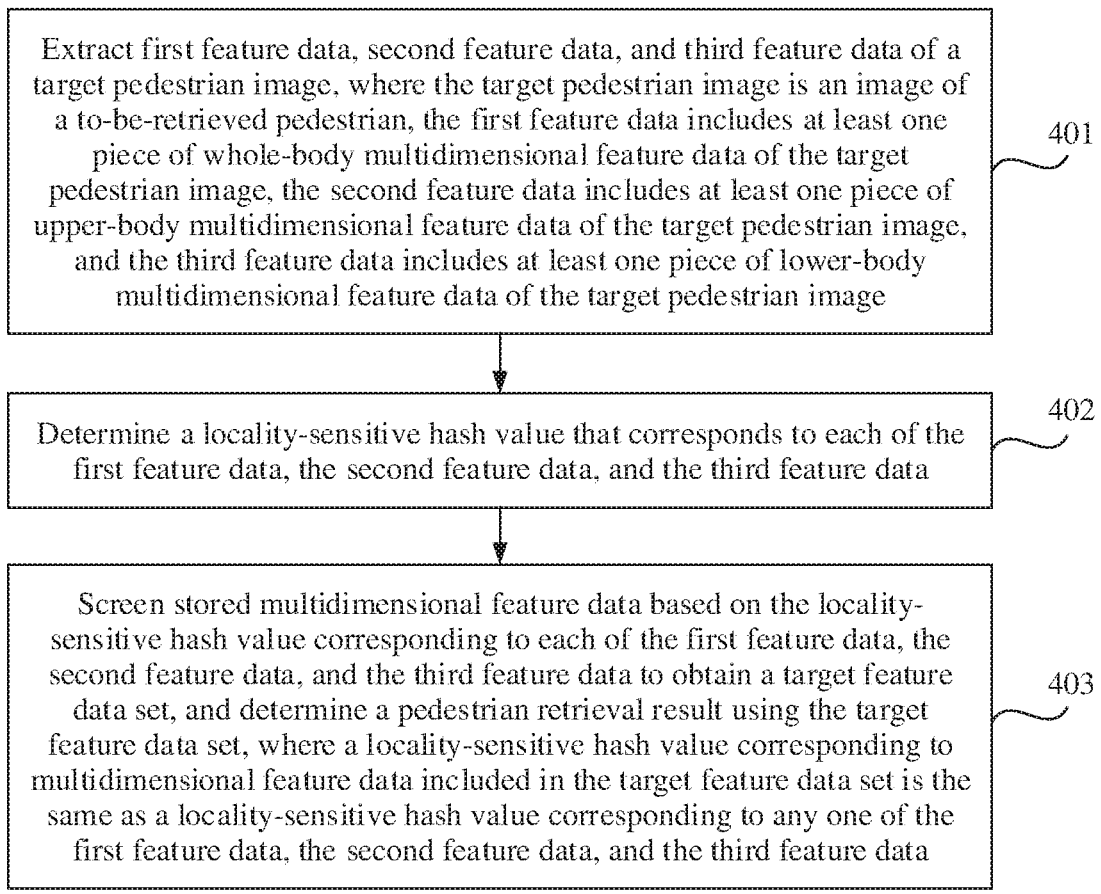
FIG. 4 is a flowchart of a pedestrian retrieval method according to an embodiment of the present disclosure.

FIG. 4 is a flowchart of a pedestrian retrieval method according to an embodiment of the present disclosure. The pedestrian retrieval method is used for a pedestrian retrieval apparatus. In the method, the pedestrian retrieval apparatus screens stored multidimensional feature data using a locality-sensitive hash value.

In this embodiment of the present disclosure, the pedestrian retrieval apparatus may first build an index based on the method in steps 301 to 305 shown in FIG. 3A. Then, a pedestrian retrieval result is determined using steps 401 to 403.

Step 401: Extract first feature data, second feature data, and third feature data of a target pedestrian image, where the target pedestrian image is an image of a to-be-retrieved pedestrian, the first feature data includes at least one piece of whole-body multidimensional feature data of the target pedestrian image, the second feature data includes at least one piece of upper-body multidimensional feature data of the target pedestrian image, and the third feature data includes at least one piece of lower-body multidimensional feature data of the target pedestrian image.

For a method for extracting, by the pedestrian retrieval apparatus, the first feature data, the second feature data, and the third feature data of the target pedestrian image after receiving the target pedestrian image, refer to the method in step 306 shown in FIG. 3B. Details are not described again in this embodiment of the present disclosure.

Step 402: Determine a locality-sensitive hash value that corresponds to each of the first feature data, the second feature data, and the third feature data.

After the first feature data, the second feature data, and the third feature data of the target pedestrian image are extracted, the pedestrian retrieval apparatus may obtain, through calculation based on the first feature data, a plurality of locality-sensitive hash values corresponding to a plurality of pieces of whole-body multidimensional feature data included in the first feature data, obtain, through calculation based on the second feature data, a plurality of locality-sensitive hash values corresponding to a plurality of pieces of upper-body multidimensional feature data included in the second feature data, and obtain, through calculation based on the third feature data, locality-sensitive hash values corresponding to a plurality of pieces of lower-body multidimensional feature data included in the third feature data.

For a method for calculating, by the pedestrian retrieval apparatus, the locality-sensitive hash value based on the first feature data, the second feature data, and the third feature data, refer to a method for calculating the locality-sensitive hash value in step 303 in the method shown in FIG. 3A. Details are not described again in this embodiment of the present disclosure.

Step 403: Screen stored multidimensional feature data based on the locality-sensitive hash value corresponding to each of the first feature data, the second feature data, and the third feature data to obtain a target feature data set, and determine a pedestrian retrieval result using the target feature data set, where a locality-sensitive hash value corresponding to multidimensional feature data included in the target feature data set is the same as a locality-sensitive hash value corresponding to any one of the first feature data, the second feature data, and the third feature data.

After determining the locality-sensitive hash value corresponding to each of the first feature data, the second feature data, and the third feature data, the pedestrian retrieval apparatus may screen the stored multidimensional feature data using the following operations in order to obtain the target feature data set.

(1) An entry corresponding to a sensitive hash value that is the same as the locality-sensitive hash value corresponding to the first feature data is selected from a plurality of entries included in a stored whole-body locality-sensitive hash table, to obtain a first entry, where the plurality of entries included in the whole-body locality-sensitive hash table are in a one-to-one correspondence with a plurality of locality-sensitive hash values, and a plurality of feature data identifiers are stored in each entry.

(2) An entry corresponding to a sensitive hash value that is the same as the locality-sensitive hash value corresponding to the second feature data is selected from a plurality of entries included in a stored upper-body locality-sensitive hash table to obtain a second entry, where the plurality of entries included in the upper-body locality-sensitive hash table are in a one-to-one correspondence with a plurality of locality-sensitive hash values, and a plurality of feature data identifiers are stored in each entry.

(3) An entry corresponding to a sensitive hash value that is the same as the locality-sensitive hash value corresponding to the third feature data is selected from a plurality of entries included in a stored lower-body locality-sensitive hash table, to obtain a third entry, where the plurality of entries included in the lower-body locality-sensitive hash table are in a one-to-one correspondence with a plurality of locality-sensitive hash values, and a plurality of feature data identifiers are stored in each entry.

(4) After the first entry, the second entry, and the third entry are obtained, because feature data identifiers corresponding to all multidimensional feature data of a same pedestrian image are the same, same feature data identifiers may exist in the obtained first entry, second entry, and third entry. Therefore, the pedestrian retrieval apparatus may reduplicate the same feature data identifiers in the first entry, the second entry, and the third entry to obtain a fifth feature data identifier set.

(5) Corresponding whole-body multidimensional feature data, upper-body multidimensional feature data, and lower-body multidimensional feature data are obtained from the stored multidimensional feature data based on each feature data identifier in the fifth feature data identifier set, to obtain the target feature data set.

For a specific implementation method of (1) to (5), refer to the related method in step 308 shown in FIG. 3B. Details are not described again in this embodiment of the present disclosure.

It should be noted that, because the fifth feature data identifier set is obtained through screening using a locality-sensitive hash value, feature data identifiers of a large amount of noise data are filtered out. In this way, when the fifth feature data identifier set is used to obtain the target feature data, the pedestrian retrieval apparatus can reduce a quantity of times of loading multidimensional feature data, thereby improving retrieval efficiency.

After the target feature data set is determined, the pedestrian retrieval apparatus may determine the pedestrian retrieval result based on the method in step 309 shown in FIG. 3B.

In this embodiment of the present disclosure, the pedestrian retrieval apparatus may screen the stored multidimensional feature data based on the plurality of pieces of extracted whole-body multidimensional feature data, upper-body multidimensional feature data, and lower-body multidimensional feature data of the target pedestrian image using a locality-sensitive hash value in order to determine a pedestrian retrieval result. Because the extracted multidimensional feature data includes whole-body multidimensional feature data, upper-body multidimensional feature data, and lower-body multidimensional feature data, the pedestrian retrieval result determined based on the extracted multidimensional feature data can ensure that all of a whole body, an upper body, and a lower body are similar, thereby ensuring retrieval accuracy. In addition, the pedestrian retrieval apparatus may screen feature data identifiers of a large amount of multidimensional feature data using a locality-sensitive hash value. Therefore, feature data identifiers of noise data are filtered out. Then, when multidimensional feature data and a pedestrian retrieval result are obtained based on feature data identifiers obtained after the filtering, a time of loading data is reduced, and retrieval efficiency is improved.

Figure 5:
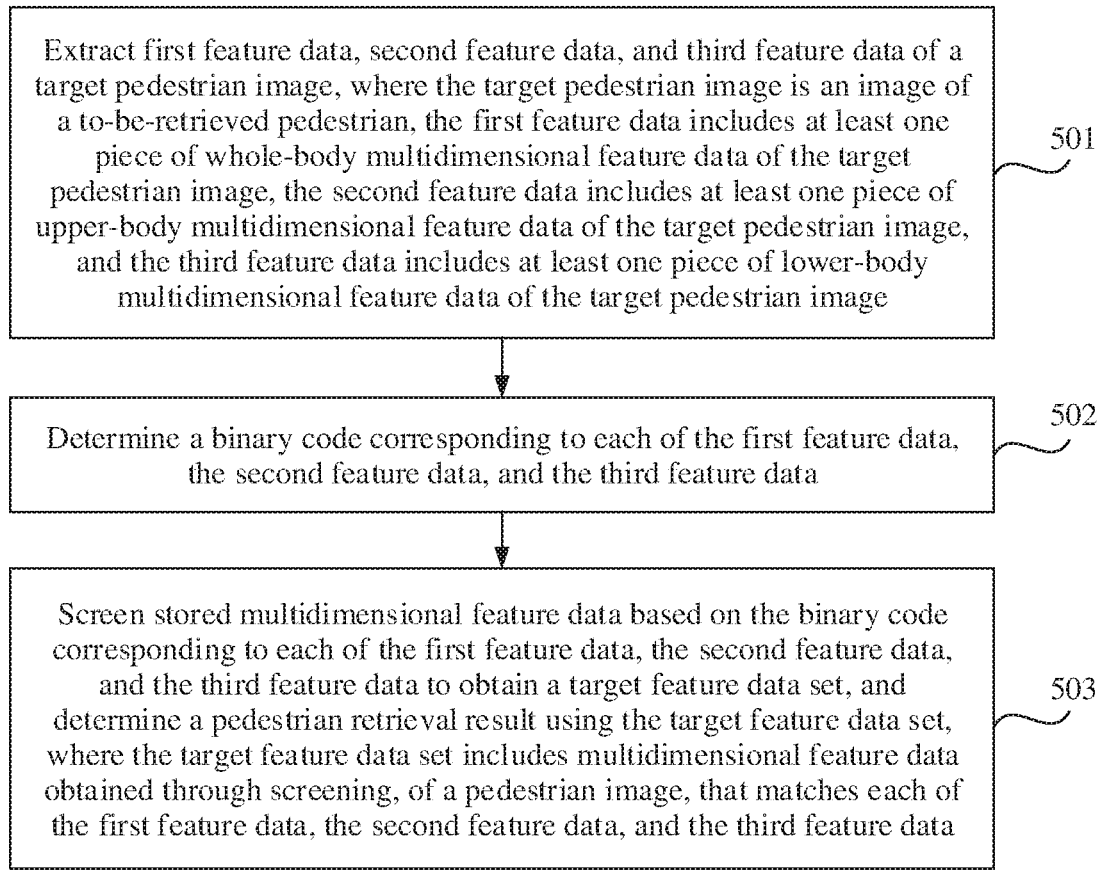
FIG. 5 is a flowchart of a pedestrian retrieval method according to an embodiment of the present disclosure.

FIG. 5 is a flowchart of a pedestrian retrieval method according to an embodiment of the present disclosure. The method is used for a pedestrian retrieval apparatus. In the method, the pedestrian retrieval apparatus screens stored multidimensional feature data using a binary code. Referring to FIG. 5, the method includes the following steps.

In this embodiment of the present disclosure, the pedestrian retrieval apparatus may first build an index based on the method in steps 301 to 305 shown in FIG. 3A. Then, a pedestrian retrieval result is determined using steps 501 to 503.

Step 501: Extract first feature data, second feature data, and third feature data of a target pedestrian image, where the target pedestrian image is an image of a to-be-retrieved pedestrian, the first feature data includes at least one piece of whole-body multidimensional feature data of the target pedestrian image, the second feature data includes at least one piece of upper-body multidimensional feature data of the target pedestrian image, and the third feature data includes at least one piece of lower-body multidimensional feature data of the target pedestrian image.

For a method for extracting, by the pedestrian retrieval apparatus, the first feature data, the second feature data, and the third feature data of the target pedestrian image after receiving the target pedestrian image, refer to the method in step 306 shown in FIG. 3B. Details are not described again in this embodiment of the present disclosure.

Step 502: Determine a binary code corresponding to each of the first feature data, the second feature data, and the third feature data.

After the first feature data, the second feature data, and the third feature data of the target pedestrian image are extracted, the pedestrian retrieval apparatus may obtain, through calculation based on the first feature data, a plurality of binary codes corresponding to a plurality of pieces of whole-body multidimensional feature data included in the first feature data, obtain, through calculation based on the second feature data, binary codes corresponding to a plurality of pieces of upper-body multidimensional feature data included in the second feature data, and obtain, through calculation based on the third feature data, binary codes corresponding to a plurality of pieces of lower-body multidimensional feature data included in the third feature data.

The pedestrian retrieval apparatus may calculate, using the formula (2) in step 303 shown in FIG. 3A, a plurality of binary codes corresponding to a plurality of pieces of whole-body multidimensional feature data included in the first feature data, and calculate a plurality of binary codes corresponding to each of the second feature data and the third feature data according to the formula (3) in step 303 shown in FIG. 3A.

Step 503: Screen stored multidimensional feature data based on the binary code corresponding to each of the first feature data, the second feature data, and the third feature data to obtain a target feature data set, and determine a pedestrian retrieval result using the target feature data set, where the target feature data set includes multidimensional feature data obtained through screening, of a pedestrian image, that matches each of the first feature data, the second feature data, and the third feature data.

After determining the binary code corresponding to each of the first feature data, the second feature data, and the third feature data, the pedestrian retrieval apparatus may screen the stored multidimensional feature data using the following operations in order to obtain the target feature data set.

(1) A binary code corresponding to whole-body multidimensional feature data in the stored multidimensional feature data is obtained from a stored correspondence between a whole-body feature data identifier and a binary code, and a hamming distance between the binary code corresponding to the first feature data and the obtained binary code is determined, to obtain a plurality of fourth hamming distances, and generate a sixth feature data identifier set. The sixth feature data identifier set includes a feature data identifier corresponding to a binary code that is used to determine a hamming distance that is in the plurality of fourth hamming distances and that is less than a first threshold.

(2) A binary code corresponding to upper-body multidimensional feature data in the stored multidimensional feature data is obtained from a stored correspondence between an upper-body feature data identifier and a binary code, and a hamming distance between the binary code corresponding to the second feature data and the obtained binary code is determined, to obtain a plurality of fifth hamming distances, and generate a seventh feature data identifier set. The seventh feature data identifier set includes a feature data identifier corresponding to a binary code that is used to determine a hamming distance that is in the plurality of fifth hamming distances and that is less than a second threshold.

(3) A binary code corresponding to lower-body multidimensional feature data in the stored multidimensional feature data is obtained from a stored correspondence between a lower-body feature data identifier and a binary code, and a hamming distance between the binary code corresponding to the third feature data and the obtained binary code is determined, to obtain a plurality of sixth hamming distances, and generate an eighth feature data identifier set. The eighth feature data identifier set includes a feature data identifier corresponding to a binary code that is used to determine a hamming distance that is in the plurality of sixth hamming distances and that is less than a third threshold.

(4) After the sixth feature data identifier set, the seventh feature data identifier set, and the eighth feature data identifier set are obtained, because feature data identifiers corresponding to all multidimensional feature data of a same pedestrian image are the same, same feature data identifiers may exist in the obtained sixth feature data identifier set, seventh feature data identifier set, and eighth feature data identifier set. Therefore, the pedestrian retrieval apparatus may reduplicate the feature data identifiers in the sixth feature data identifier set, the seventh feature data identifier set, and the eighth feature data identifier set to obtain a ninth feature data identifier set.

(5) Corresponding whole-body multidimensional feature data, upper-body multidimensional feature data, and lower-body multidimensional feature data are obtained from the stored multidimensional feature data based on feature data identifiers in the ninth feature data identifier set, to obtain the target feature data set.

For a specific implementation method of (1) to (5), refer to the related method in step 308 shown in FIG. 3B. Details are not described again in this embodiment of the present disclosure.

It should be noted that, because the ninth feature data identifier set is obtained through screening using a binary code, feature data identifiers of a large amount of noise data are filtered out. In this way, when the ninth feature data identifier set is used to obtain the target feature data, the pedestrian retrieval apparatus can reduce a quantity of times of loading multidimensional feature data, thereby improving retrieval efficiency.

After the target feature data set is determined, the pedestrian retrieval apparatus may determine the pedestrian retrieval result based on the method in step 309 shown in FIG. 3B.

In this embodiment of the present disclosure, the pedestrian retrieval apparatus may screen the stored multidimensional feature data based on the plurality of pieces of extracted whole-body multidimensional feature data, upper-body multidimensional feature data, and lower-body multidimensional feature data of the target pedestrian image using a binary code in order to determine a pedestrian retrieval result. Because the extracted multidimensional feature data includes whole-body multidimensional feature data, upper-body multidimensional feature data, and lower-body multidimensional feature data, the pedestrian retrieval result determined based on the extracted multidimensional feature data can ensure that all of a whole body, an upper body, and a lower body are similar, thereby ensuring retrieval accuracy. In addition, the pedestrian retrieval apparatus may screen feature data identifiers of a large amount of multidimensional feature data using a binary code. Therefore, feature data identifiers of some noise data are filtered out. Then, when multidimensional feature data and a pedestrian retrieval result are obtained based on feature data identifiers obtained after the filtering, a time of loading feature data is reduced, and retrieval efficiency is improved.

Figure 6A:
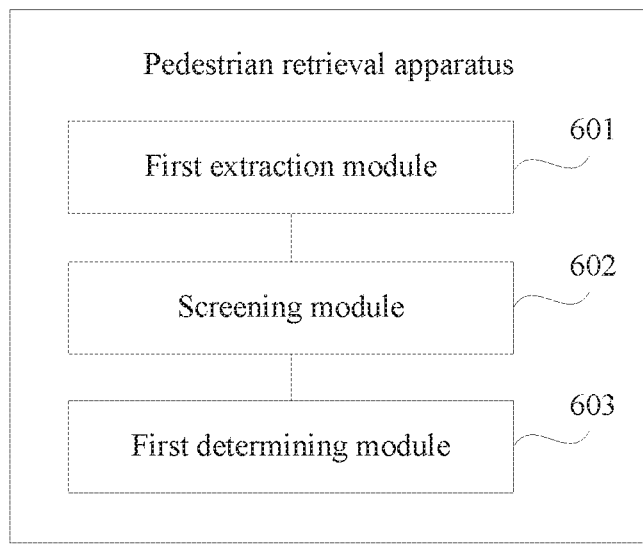
FIG. 6A is a schematic diagram of a pedestrian retrieval apparatus according to an embodiment of the present disclosure.

FIG. 6A is a schematic diagram of a pedestrian retrieval apparatus according to an embodiment of the present disclosure. Referring to FIG. 6A, the pedestrian retrieval apparatus is configured to perform the method shown in FIG. 3A and FIG. 3B, FIG. 4, or FIG. 5, and the pedestrian retrieval apparatus includes a first extraction module 601, a screening module 602, and a first determining module 603.

The first extraction module 601 is configured to perform step 306, step 401, or step 501 in the foregoing embodiments.

The screening module 602 is configured to perform step 307 and step 308, or step 402 and step 403, or step 502 and step 503 in the foregoing embodiments.

The first determining module 603 is configured to perform step 309 in the foregoing embodiment.

Optionally, the screening module 602 includes a first determining unit configured to determine a locality-sensitive hash value corresponding to each of the first feature data, the second feature data, and the third feature data, and a screening unit configured to screen the stored multidimensional feature data based on the locality-sensitive hash value corresponding to each of the first feature data, the second feature data, and the third feature data, to obtain the target feature data set, where a locality-sensitive hash value corresponding to any multidimensional feature data included in the target feature data set is the same as a locality-sensitive hash value corresponding to at least one of the first feature data, the second feature data, and the third feature data.

Optionally, the screening unit is further configured to determine a binary code corresponding to each of the first feature data, the second feature data, and the third feature data, select, from a plurality of entries included in a stored whole-body locality-sensitive hash table, an entry corresponding to a locality-sensitive hash value that is the same as the locality-sensitive hash value corresponding to the first feature data, to obtain a first entry, where the plurality of entries included in the whole-body locality-sensitive hash table are in a one-to-one correspondence with a plurality of locality-sensitive hash values, and a plurality of feature data identifiers are stored in each entry, select, from a plurality of entries included in a stored upper-body locality-sensitive hash table, an entry corresponding to a locality-sensitive hash value that is the same as the locality-sensitive hash value corresponding to the second feature data, to obtain a second entry, where the plurality of entries included in the upper-body locality-sensitive hash table are in a one-to-one correspondence with a plurality of locality-sensitive hash values, and a plurality of feature data identifiers are stored in each entry, select, from a plurality of entries included in a stored lower-body locality-sensitive hash table, an entry corresponding to a locality-sensitive hash value that is the same as the locality-sensitive hash value corresponding to the third feature data to obtain a third entry, where the plurality of entries included in the lower-body locality-sensitive hash table are in a one-to-one correspondence with a plurality of locality-sensitive hash values, and a plurality of feature data identifiers are stored in each entry, determine a plurality of first binary codes from a stored correspondence between a whole-body feature data identifier and a binary code based on a plurality of feature data identifiers stored in the first entry, determine a plurality of second binary codes from a stored correspondence between an upper-body feature data identifier and a binary code based on a plurality of feature data identifiers stored in the second entry, and determine a plurality of third binary codes from a stored correspondence between a lower-body feature data identifier and a binary code based on a plurality of feature data identifiers stored in the third entry, and determine the target feature data set from the stored multidimensional feature data based on the binary code corresponding to each of the first feature data, the second feature data, and the third feature data, the plurality of first binary codes, the plurality of second binary codes, and the plurality of third binary codes.

Optionally, the screening unit is further configured to determine a hamming distance between the binary code corresponding to the first feature data and each of the plurality of first binary codes, to obtain a plurality of first hamming distances, and generate a first feature data identifier set, where the first feature data identifier set includes a feature data identifier corresponding to a first binary code that is used to determine a hamming distance that is in the plurality of first hamming distances and that is less than a first threshold, determine a hamming distance between the binary code corresponding to the second feature data and each of the plurality of second binary codes to obtain a plurality of second hamming distances, and generate a second feature data identifier set, where the second feature data identifier set includes a feature data identifier corresponding to a second binary code that is used to determine a hamming distance that is in the plurality of second hamming distances and that is less than a second threshold, determine a hamming distance between the binary code corresponding to the third feature data and each of the plurality of third binary codes, to obtain a plurality of third hamming distances, and generate a third feature data identifier set, where the third feature data identifier set includes a feature data identifier corresponding to a third binary code that is used to determine a hamming distance that is in the plurality of third hamming distances and that is less than a third threshold, reduplicate same feature data identifiers in the first feature data identifier set, the second feature data identifier set, and the third feature data identifier set to obtain a fourth feature data identifier set, where whole-body multidimensional feature data, upper-body multidimensional feature data, and lower-body multidimensional feature data of a same pedestrian image are of a same feature data identifier, and obtain corresponding whole-body multidimensional feature data, upper-body multidimensional feature data, and lower-body multidimensional feature data from the stored multidimensional feature data based on each feature data identifier in the fourth feature data identifier set, to obtain the target feature data set.

Optionally, the first determining module 603 includes a second determining unit configured to determine a chi-square distance between the first feature data and whole-body multidimensional feature data, a chi-square distance between the second feature data and upper-body multidimensional feature data, and a chi-square distance between the third feature data and lower-body multidimensional feature data, where the whole-body multidimensional feature data, the upper-body multidimensional feature data, and the lower-body multidimensional feature data correspond to a same feature data identifier in the target feature data set, to obtain a plurality of whole-body distances, a plurality of upper-body distances, and a plurality of lower-body distances, an operation unit configured to perform, based on preset weights, a weighting operation on a whole-body distance, an upper-body distance, and a lower-body distance that correspond to a same feature data identifier in the plurality of whole-body distances, the plurality of upper-body distances, and the plurality of lower-body distances, to obtain a weighted distance corresponding to each feature data identifier of the multidimensional feature data included in the target feature data set, a first selection unit configured to select, based on a stored correspondence between a pedestrian identifier and a feature data identifier, a feature data identifier of a same pedestrian identifier from the feature data identifiers of the multidimensional feature data included in the target feature data set, to obtain a plurality of groups of feature data identifiers, where each group of feature data identifiers corresponds to a same pedestrian identifier, a second selection unit configured to select a minimum weighted distance from weighted distances corresponding to each of the plurality of group of feature data identifiers, to obtain a plurality of minimum weighted distances, a sorting unit configured to sort the plurality of minimum weighted distances to obtain a sorting result, a third determining unit configured to determine the pedestrian retrieval result based on feature data identifiers corresponding to the plurality of minimum weighted distances, and a display unit configured to display the pedestrian retrieval result based on the sorting result.

Figure 6B:
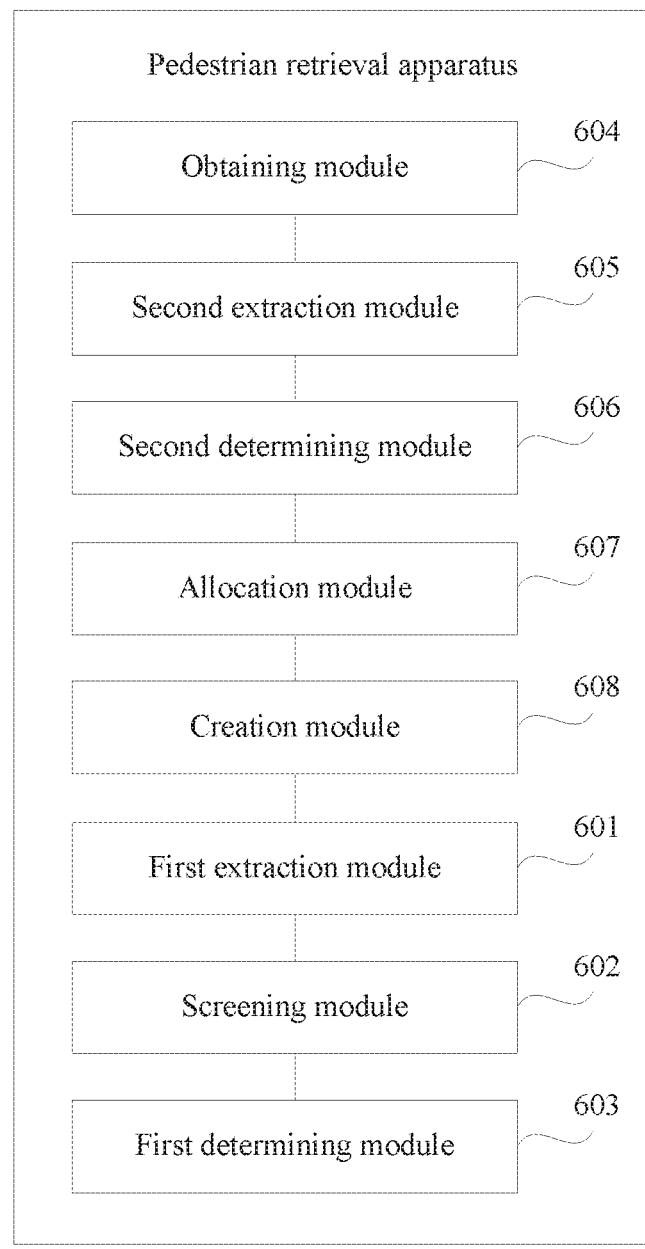
FIG. 6B is another schematic diagram of a pedestrian retrieval apparatus according to an embodiment of the present disclosure.

Optionally, referring to FIG. 6B, the pedestrian retrieval apparatus further includes an obtaining module 604 configured to obtain a pedestrian image in a video frame image included in a surveillance video to obtain a plurality of pedestrian images, a second extraction module 605 configured to separately extract fourth feature data, fifth feature data, and sixth feature data of each of the plurality of pedestrian images, where the fourth feature data includes at least one piece of whole-body multidimensional feature data of the pedestrian image, the fifth feature data includes at least one piece of upper-body multidimensional feature data of the pedestrian image, and the sixth feature data includes at least one piece of lower-body multidimensional feature data of the pedestrian image, a second determining module 606 configured to determine a locality-sensitive hash value and a binary code that correspond to each of the fourth feature data, the fifth feature data, and the sixth feature data, an allocation module 607 configured to allocate a feature data identifier to multidimensional feature data of each of the plurality of pedestrian images, where whole-body multidimensional feature data, upper-body multidimensional feature data, and lower-body multidimensional feature data of a same pedestrian image are of a same feature data identifier, and a creation module 608 configured to create the whole-body locality-sensitive hash table, the upper-body locality-sensitive hash table, the lower-body locality-sensitive hash table, the correspondence between a whole-body feature data identifier and a binary code, the correspondence between an upper-body feature data identifier and a binary code, and the correspondence between a lower-body feature data identifier and a binary code based on the feature data identifier of the multidimensional feature data of each pedestrian image and the locality-sensitive hash value and the binary code that correspond to each of the fourth feature data, the fifth feature data, and the sixth feature data.

Optionally, the creation module 608 includes a first creation unit configured to divide the fourth feature data of the plurality of pedestrian images into a plurality of groups, where each group of fourth feature data corresponds to a same locality-sensitive hash value, store feature data identifiers of a same group of fourth feature data in a same entry in order to create the whole-body locality-sensitive hash table that includes a plurality of entries, divide the fifth feature data of the plurality of pedestrian images into a plurality of groups, where each group of fifth feature data corresponds to a same locality-sensitive hash value, store feature data identifiers of a same group of fifth feature data in a same entry in order to create the upper-body locality-sensitive hash table that includes a plurality of entries, divide the sixth feature data of the plurality of pedestrian images into a plurality of groups, where each group of sixth feature data corresponds to a same locality-sensitive hash value, and store feature data identifiers of a same group of sixth feature data in a same entry in order to create the lower-body locality-sensitive hash table that includes a plurality of entries, and a second creation unit configured to correspondingly store feature data identifiers of the fourth feature data of the plurality of pedestrian images and corresponding binary codes in order to create the correspondence between a whole-body feature data identifier and a binary code, correspondingly store feature data identifiers of the fifth feature data of the plurality of pedestrian images and corresponding binary codes in order to create the correspondence between an upper-body feature data identifier and a binary code, and correspondingly store feature data identifiers of the sixth feature data of the plurality of pedestrian images and corresponding binary codes in order to create the correspondence between a lower-body feature data identifier and a binary code.

In conclusion, in this embodiment of the present disclosure, the pedestrian retrieval apparatus may extract a plurality of pieces of whole-body multidimensional feature data, upper-body multidimensional feature data, and lower-body multidimensional feature data from a plurality of pedestrian images, and build an index using a locality-sensitive hash value and a binary code. Then, after receiving a retrieval request, the pedestrian retrieval apparatus may screen a large amount of stored multidimensional feature data based on a target pedestrian image using a locality-sensitive hash value and a binary code in order to obtain a target feature data set of pedestrian images similar to the target pedestrian image. Then, the pedestrian retrieval apparatus may determine a pedestrian retrieval result based on the target feature data set. Because the extracted multidimensional feature data includes whole-body multidimensional feature data, upper-body multidimensional feature data, and lower-body multidimensional feature data, the pedestrian retrieval result determined based on the extracted multidimensional feature data can ensure that all of a whole body, an upper body, and a lower body are similar, thereby ensuring retrieval accuracy. In addition, the pedestrian retrieval result is obtained through screening in two manners, to be specific, using a locality-sensitive hash value and using a binary code, which further ensures accuracy of the pedestrian retrieval result, and because the extracted multidimensional feature data includes multidimensional feature data of different features, the determined pedestrian retrieval result may be similar to a plurality of features of the target pedestrian image, thereby further improving retrieval accuracy. Based on the foregoing ensured retrieval accuracy, because the pedestrian retrieval apparatus performs two-layer screening on feature data identifiers of a large amount of multidimensional feature data, feature data identifiers of more noise data are filtered out. Then, when multidimensional feature data and a pedestrian retrieval result are obtained based on feature data identifiers obtained after the filtering, a time of loading data is greatly reduced, and retrieval efficiency is improved.

It should be noted that, when the pedestrian retrieval apparatus provided in the foregoing embodiment performs pedestrian retrieval, division of the foregoing functional modules is used only as an example for description. In actual application, the foregoing functions may be allocated to different functional modules and implemented based on a requirement, that is, an internal structure of the pedestrian retrieval apparatus is divided into different functional modules for implementing all or some of the functions described above. In addition, the pedestrian retrieval apparatus provided in the embodiments belongs to a same concept as the embodiments of the pedestrian retrieval method. For a specific implementation process, refer to the method embodiments. Details are not described herein again.

All or some of the foregoing embodiments may be implemented through software, hardware, firmware, or any combination thereof. When software is used to implement the embodiments, the embodiments may be implemented completely or partially in a form of a computer program product. The computer program product includes one or more computer instructions. When the computer instructions are loaded and executed on the computer, the procedure or functions according to the embodiments of the present disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a FLOPPY DISK, a hard disk, or a magnetic tape), an optical medium (for example, a DVD), a semiconductor medium (for example, a solid state disk (SSD)), or the like.

A person of ordinary skill in the art may understand that all or some of the steps of the embodiments may be implemented by hardware or a program instructing related hardware. The program may be stored in a computer-readable storage medium. The storage medium may include a read-only memory, a magnetic disk, or an optical disc.

The foregoing descriptions are merely embodiments of this disclosure, but are not intended to limit this disclosure. Any modification, equivalent replacement, or improvement made without departing from the spirit and principle of this disclosure shall fall within the protection scope of this disclosure.

What is claimed is:

1. A pedestrian retrieval method, comprising:
    extracting a first feature data and a second feature data of a target pedestrian image, wherein the first feature data comprises a body multidimensional feature data of the target pedestrian image including a plurality of first features corresponding to a whole body, and wherein the second feature data comprises a body part multidimensional feature data of the target pedestrian image including a plurality of second features corresponding to a body part;
    screening, based on locality-sensitive hash value corresponding to each of the first features and the second features, stored first multidimensional feature data based on the first feature data and the second feature data to obtain a target feature data set, wherein the target feature data set comprises second multidimensional feature data obtained through screening a pedestrian image and matching each of the first feature data and the second feature data, and wherein a locality-sensitive hash value corresponding to any one of the second multidimensional feature data in the target feature data set is the same as the locality-sensitive hash value corresponding to at least one of the first feature data or the second feature data;

obtaining a pedestrian retrieval result using the target feature data set; and outputting the pedestrian retrieval result.

2. The pedestrian retrieval method of claim 1, wherein the body part is an upper-body.

3. The pedestrian retrieval method of claim 1, further comprising extracting a third feature data of the target pedestrian image, wherein the third feature data comprises a lower-body multidimensional feature data of the target pedestrian image, and wherein the target feature data set further comprises third multidimensional feature data obtained through screening a pedestrian image and matching the third feature data.

4. The pedestrian retrieval method of claim 1, wherein the body multidimensional feature data comprises at least one of a first color feature or a first texture feature, and wherein the body part multidimensional feature data comprises at least one of a second color feature or a second texture feature.

5. The pedestrian retrieval method of claim 1, wherein the stored first-multidimensional feature data comprises:
 body multidimensional feature data of each image of a plurality of stored images; and
 body part multidimensional feature data of each of the stored images.

6. The pedestrian retrieval method of claim 1, wherein screening the stored first multidimensional feature data comprises:
 determining a binary code corresponding to each of the first feature data and the second feature data;
 selecting, from a plurality of entries in a stored body locality-sensitive hash table, an entry corresponding to a locality-sensitive hash value that is the same as the locality-sensitive hash value corresponding to the first feature data to obtain a first entry, wherein the entries in the stored body locality-sensitive hash table are in a one-to-one correspondence with a plurality of locality-sensitive hash values, and wherein a plurality of feature data identifiers are stored in each entry in a stored whole-body locality-sensitive hash table;
 selecting, from a plurality of entries in a stored body part locality-sensitive hash table, an entry corresponding to a locality-sensitive hash value that is the same as the locality-sensitive hash value corresponding to the second feature data to obtain a second entry, wherein the entries comprised in the stored body part locality-sensitive hash table are in a one-to-one correspondence with the locality-sensitive hash values, and wherein the feature data identifiers are stored in each entry in the stored body part locality-sensitive hash table;
 determining a plurality of first binary codes from a stored correspondence between a whole-body feature data identifier and a binary code based on a plurality of feature data identifiers stored in the first entry;
 determining a plurality of second binary codes from a stored correspondence between a body part feature data identifier and another binary code based on a plurality of feature data identifiers stored in the second entry; and
 determining the target feature data set from the stored first multidimensional feature data based on the binary code corresponding to each of the first feature data, the second feature data, the first binary codes, and the second binary codes.

7. The pedestrian retrieval method of claim 6, wherein determining the target feature data set comprises:
 determining a hamming distance between the binary code corresponding to the first feature data and each of the first binary codes to obtain a plurality of first hamming distances;
 generating a first feature data identifier set, wherein the first feature data identifier set comprises a feature data identifier corresponding to a first binary code determining a hamming distance in the first hamming distances and less than a first threshold;
 determining a hamming distance between the binary code corresponding to the second feature data and each of the second binary codes to obtain a plurality of second hamming distances;
 generating a second feature data identifier set, wherein the second feature data identifier set comprises a feature data identifier corresponding to a second binary code determining a hamming distance in the second hamming distances and less than a second threshold;
 reduplicating same feature data identifiers in the first feature data identifier set and the second feature data identifier set to obtain a third feature data identifier set, wherein a whole-body multidimensional feature data and a body part multidimensional feature data of a same pedestrian image are of a same feature data identifier; and
 obtaining, from the stored first multidimensional feature data based on each of the feature data identifiers in the third feature data identifier set, a corresponding whole-body multidimensional feature data and a corresponding body part multidimensional feature data to obtain the target feature data set.

8. The pedestrian retrieval method of claim 6, wherein the pedestrian retrieval method further comprises, before screening the stored first multidimensional feature data:
 obtaining a plurality of pedestrian images in a video frame image of a surveillance video;
 separately extracting a fourth feature data and a fifth feature data, of each of the pedestrian images, wherein the fourth feature data comprises a whole-body multidimensional feature data of the pedestrian image, and wherein the fifth feature data comprises a body part multidimensional feature data of the pedestrian image;
 determining a locality-sensitive hash value and a binary code corresponding to each of the fourth feature data and the fifth feature data;
 allocating a feature data identifier to multidimensional feature data of each of the pedestrian images, wherein a whole-body multidimensional feature data and a body part multidimensional feature data of a same pedestrian image comprise a same feature data identifier; and
 creating the stored whole-body locality-sensitive hash table, the stored body part locality-sensitive hash table, the stored correspondence between the whole-body feature data identifier and the binary code, and the stored correspondence between the body part feature data identifier and the other binary code, based on the feature data identifier of the multidimensional feature data of each of the pedestrian image and the locality-sensitive hash value and the binary code corresponding to each of the fourth feature data and the fifth feature data.

9. The pedestrian retrieval method of claim 8, wherein creating the stored body locality-sensitive hash table, the stored body part locality-sensitive hash table, the stored correspondence between the whole-body feature data identifier and the binary code, and the stored correspondence between the body part feature data identifier and the other binary code comprises:
- dividing the fourth feature data of the pedestrian images into a plurality of groups, wherein each one of the groups of the fourth feature data corresponds to a same locality-sensitive hash value;
- storing feature data identifiers of a same group of the fourth feature data in a same entry to create the stored body locality-sensitive hash table;
- dividing the fifth feature data of the pedestrian images into a plurality of groups, wherein each one of the groups of the fifth feature data corresponds to a same another locality-sensitive hash value;
- storing feature data identifiers of a same group of the fifth feature data in a same entry to create the stored body part locality-sensitive hash table;
- storing feature data identifiers of the fourth feature data of the pedestrian images and corresponding binary codes to create the stored correspondence between the whole-body feature data identifier and the binary code; and
- storing feature data identifiers of the fifth feature data of the pedestrian images and corresponding binary codes to create the stored correspondence between the body part feature data identifier and the other binary code.

10. The pedestrian retrieval method of claim 1, wherein determining the pedestrian retrieval result comprises:
- determining a chi-square distance between the first feature data and body multidimensional feature data to obtain a plurality of body distances;
- determining a chi-square distance between the second feature data and body part multidimensional feature data to obtain a plurality of body part distances, wherein the body multidimensional feature data and the body part multidimensional feature data correspond to a same feature data identifier in the target feature data set;
- performing, based on preset weights, a weighting operation on a body distance and a body part distance corresponding to the same feature data identifier in the body distances and the body part distances to obtain a weighted distance corresponding to each feature data identifier of the second multidimensional feature data;
- selecting, based on a stored correspondence between a pedestrian identifier and a feature data identifier, a feature data identifier of a same pedestrian identifier from feature data identifiers of the second multidimensional feature data to obtain a plurality of groups of feature data identifiers, wherein each one of the groups of the feature data identifiers corresponds to the same pedestrian identifier;
- selecting a minimum weighted distance from weighted distances corresponding to each one of the groups of the feature data identifiers to obtain a plurality of minimum weighted distances;
- sorting the minimum weighted distances to obtain a sorting result;
- determining the pedestrian retrieval result based on feature data identifiers corresponding to the minimum weighted distances; and
- displaying the pedestrian retrieval result based on the sorting result.

11. A pedestrian retrieval apparatus, comprising:
a memory comprising instructions; and
one or more processors in communication with the memory and configured to execute the instructions, which cause the one or more processors to be configured to:
- extract a first feature data and a second feature data of a target pedestrian image, wherein the first feature data comprises a body multidimensional feature data of the target pedestrian image including a plurality of first features corresponding to a whole body, and wherein the second feature data comprises a body part multidimensional feature data of the target pedestrian image including a plurality of second features corresponding to a body part;
- screen, based on locality-sensitive hash value corresponding to each of the first features and the second features, stored first multidimensional feature data based on the first feature data and the second feature data to obtain a target feature data set, wherein the target feature data set comprises second multidimensional feature data obtained through screening, of a pedestrian image, matching each of the first feature data and the second feature data, wherein a locality-sensitive hash value corresponding to any one of the second multidimensional feature data in the target feature data set is the same as the locality-sensitive hash value corresponding to at least one of the first feature data or the second feature data;
- determine a pedestrian retrieval result using the target feature data set; and
- output the pedestrian retrieval result.

12. The pedestrian retrieval apparatus of claim 11, wherein the body part is an upper body.

13. The pedestrian retrieval apparatus of claim 11, wherein the instructions further cause the one or more processors to be configured to extract a third feature data of the target pedestrian image, wherein the third feature data comprises a lower-body multidimensional feature data of the target pedestrian image, and wherein the target feature data set further comprises third multidimensional feature data obtained through screening a pedestrian image and matching the third feature data.

14. The pedestrian retrieval apparatus of claim 11, wherein the body multidimensional feature data comprises at least one of a first color feature or a first texture feature, and wherein the body part multidimensional feature data comprises at least one of a second color feature or a second texture feature.

15. The pedestrian retrieval apparatus of claim 11, wherein the stored first multidimensional feature data comprises:
- body multidimensional feature data of each image of a plurality of stored images; and
- body part multidimensional feature data of each of the stored images.

16. The pedestrian retrieval apparatus of claim 11, wherein the instructions further cause the one or more processors to be configured to:
- determine a chi-square distance between the first feature data and body multidimensional feature data to obtain a plurality of body distances;
- determine a chi-square distance between the second feature data and body part multidimensional feature data to obtain a plurality of body part distances, wherein the body multidimensional feature data and the body part multidimensional feature data correspond to a same feature data identifier in the target feature data set;

perform, based on preset weights, a weighting operation on a body distance and a body part distance corresponding to the same feature data identifier in the body distances and the body part distances to obtain a weighted distance corresponding to each feature data identifier of the second multidimensional feature data;

select, based on a stored correspondence between a pedestrian identifier and a feature data identifier, a feature data identifier of a same pedestrian identifier from feature data identifiers of the second multidimensional feature data to obtain a plurality of groups of the feature data identifiers, wherein each one of the groups of the feature data identifiers corresponds to the same pedestrian identifier;

select a minimum weighted distance from weighted distances corresponding to each one of the groups of the feature data identifiers to obtain a plurality of minimum weighted distances;

sort the minimum weighted distances to obtain a sorting result;

determine the pedestrian retrieval result based on feature data identifiers corresponding to the minimum weighted distances; and display the pedestrian retrieval result based on the sorting result.

17. A computer program product comprising computer-executable instructions for storage on a non-transitory computer-readable medium that, when executed by one or more processors of a pedestrian retrieval apparatus, cause the one or more processors to:

extract a first feature data and a second feature data of a target pedestrian image, wherein the first feature data comprises a body multidimensional feature data of the target pedestrian image including a plurality of first features corresponding to a whole body, and wherein the second feature data comprises a body part multidimensional feature data of the target pedestrian image including a plurality of second features corresponding to a body part;

screen, based on locality-sensitive hash value corresponding to each of the first features and the second features, stored first multidimensional feature data based on the first feature data and the second feature data to obtain a target feature data set, wherein the target feature data set comprises second multidimensional feature data obtained through screening, of a pedestrian image, matching each of the first feature data and the second feature data, wherein a locality-sensitive hash value corresponding to any one of the second multidimensional feature data in the target feature data set is the same as the locality-sensitive hash value corresponding to at least one of the first feature data or the second feature data;

determine a pedestrian retrieval result using the target feature data set; and output the pedestrian retrieval result.

18. The computer program product of claim 17, wherein the body part is an upper body.

* * * * *